(12) United States Patent
Fujikawa et al.

(10) Patent No.: US 10,867,729 B2
(45) Date of Patent: Dec. 15, 2020

(54) METHOD FOR PRODUCING SINTERED BODY THAT FORMS RARE-EARTH PERMANENT MAGNET AND HAS NON-PARALLEL EASY MAGNETIZATION AXIS ORIENTATION

(71) Applicant: NITTO DENKO CORPORATION, Osaka (JP)

(72) Inventors: Kenichi Fujikawa, Osaka (JP); Katsuya Kume, Osaka (JP); Kazuo Ouchi, Osaka (JP); Toshinobu Hoshino, Osaka (JP); Masakazu Morimoto, Osaka (JP); Hirofumi Ono, Osaka (JP); Katsuyuki Nakabayashi, Osaka (JP); Miho Yamaguchi, Osaka (JP); Hiroshi Matsuo, Osaka (JP); Toshiaki Okuno, Osaka (JP); Makoto Fujihara, Osaka (JP); Eiichi Imoto, Osaka (JP); Hirofumi Ebe, Osaka (JP); Tomohiro Omure, Osaka (JP); Izumi Ozeki, Osaka (JP); Takashi Yamamoto, Osaka (JP); Yuki Kato, Osaka (JP); Tomoya Matsuda, Osaka (JP); Shoichiro Saito, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 329 days.

(21) Appl. No.: 15/559,652

(22) PCT Filed: Mar. 24, 2016

(86) PCT No.: PCT/JP2016/059393
§ 371 (c)(1),
(2) Date: Jan. 9, 2018

(87) PCT Pub. No.: WO2016/152978
PCT Pub. Date: Sep. 29, 2016

(65) Prior Publication Data
US 2018/0130581 A1    May 10, 2018

(30) Foreign Application Priority Data

Mar. 24, 2015  (JP) .................................. 2015-061080
Mar. 24, 2015  (JP) .................................. 2015-061081
(Continued)

(51) Int. Cl.
*H01F 1/08*      (2006.01)
*H01F 7/02*      (2006.01)
(Continued)

(52) U.S. Cl.
CPC ............. *H01F 1/086* (2013.01); *H01F 1/057* (2013.01); *H01F 7/02* (2013.01); *H01F 41/0273* (2013.01);
(Continued)

(58) Field of Classification Search
CPC ...... H01F 1/086; H01F 1/0555; H01F 1/0556; H01F 1/0557; H01F 1/057
See application file for complete search history.

(56) References Cited

U.S. PATENT DOCUMENTS 5,705,902 A    1/1998  Merritt et al.
5,808,381 A    9/1998  Aoyama et al.
(Continued)

FOREIGN PATENT DOCUMENTS

CN    103081038 A    5/2013
EP    0369462 A1     5/1990
(Continued)

OTHER PUBLICATIONS

JP-4798357-B2 translated. (Year: 2011).*
(Continued)

*Primary Examiner* — Anthony J Zimmer
*Assistant Examiner* — Ricardo D Morales
(74) *Attorney, Agent, or Firm* — Hauptman Ham, LLP

(57) ABSTRACT

Provided is a method for producing a sintered body that forms a rare-earth permanent magnet, has a single sintered
(Continued)

structure and an arbitrary shape, and has easy magnetization axis orientations of different directions applied to the magnet material particles in a plurality of arbitrary regions. This method forms a three-dimensional first molded article from a composite material formed by mixing a resin material and magnet material particles containing a rare-earth substance. The first molded article is then subjected to a deforming force and a second molded article is formed in which the orientation direction of the easy magnetization axis of the magnet material particles in at least the one section of the horizontal cross-section is changed to a direction which differs from the orientation direction of the first molded article. The second molded article is heated to a sintering temperature and kept at the temperature for a period of time.

28 Claims, 19 Drawing Sheets

(30) Foreign Application Priority Data

| Jun. 18, 2015 | (JP) | 2015-122734 |
|---|---|---|
| Jul. 31, 2015 | (JP) | 2015-151761 |
| Feb. 9, 2016 | (JP) | 2016-022770 |
| Mar. 1, 2016 | (JP) | 2016-039115 |
| Mar. 1, 2016 | (JP) | 2016-039116 |

(51) Int. Cl.
  *H02K 1/27* (2006.01)
  *H01F 41/02* (2006.01)
  *H01F 1/057* (2006.01)

(52) U.S. Cl.
  CPC .......... *H01F 41/0293* (2013.01); *H02K 1/27* (2013.01); *H01F 1/0577* (2013.01); *H01F 41/028* (2013.01)

(56) References Cited

U.S. PATENT DOCUMENTS

| 6,157,099 | A | 12/2000 | Hartman | |
| 6,187,259 | B1* | 2/2001 | Yamashita | H01F 1/0577 419/12 |
| 6,304,162 | B1 | 10/2001 | Nakatsuka et al. | |
| 6,764,289 | B1 | 7/2004 | Hartman et al. | |
| 9,281,107 | B2 | 3/2016 | Taihaku et al. | |
| 9,991,033 | B2 | 6/2018 | Taihaku et al. | |
| 9,991,034 | B2 | 6/2018 | Taihaku et al. | |
| 2005/0076973 | A1 | 4/2005 | Masuzawa et al. | |
| 2006/0113857 | A1 | 6/2006 | Honkura et al. | |
| 2008/0231989 | A1 | 9/2008 | Oki et al. | |
| 2009/0007417 | A1* | 1/2009 | Yamashita | H01F 41/028 29/608 |
| 2009/0127960 | A1 | 5/2009 | Kawamura et al. | |
| 2012/0032537 | A1 | 2/2012 | Yamashita et al. | |
| 2012/0262019 | A1 | 10/2012 | Smith et al. | |
| 2013/0285778 | A1 | 10/2013 | Taihaku et al. | |
| 2013/0328453 | A1 | 12/2013 | Duncan et al. | |
| 2014/0145808 | A1* | 5/2014 | Kume | H01F 1/0536 335/302 |
| 2016/0141100 | A1 | 5/2016 | Taihaku et al. | |
| 2016/0196903 | A1 | 7/2016 | Taihaku et al. | |

FOREIGN PATENT DOCUMENTS

| EP | 2146357 A1 | 1/2010 | | |
| JP | S57-2801 | 1/1982 | | |
| JP | S57-002801 | 1/1982 | | |
| JP | S61-69104 | 4/1986 | | |
| JP | 02308512 A | * 12/1990 | ........... | H01F 1/0576 |
| JP | H02-308512 A | 12/1990 | | |
| JP | H6-244046 | 9/1994 | | |
| JP | H6-302417 | 10/1994 | | |
| JP | H8-107665 A | 4/1996 | | |
| JP | 2000-208322 | 7/2000 | | |
| JP | 2001-006924 A | 1/2001 | | |
| JP | 2004-031780 A | 1/2004 | | |
| JP | 2005-044820 | 2/2005 | | |
| JP | 2006-222131 | 8/2006 | | |
| JP | 3864986 B2 | 10/2006 | | |
| JP | 2008-252968 A | 10/2008 | | |
| JP | 2009-142144 A | 6/2009 | | |
| JP | 2009-254143 A | 10/2009 | | |
| JP | 2009-284740 A | 12/2009 | | |
| JP | 2010-104136 A | 5/2010 | | |
| JP | 2010-200459 A | 9/2010 | | |
| JP | 2011-109004 A | 6/2011 | | |
| JP | 2011109004 A | * 6/2011 | | |
| JP | 4798357 B2 | * 10/2011 | | |
| JP | 2013-191611 A | 9/2013 | | |
| JP | 2013-191612 | 9/2013 | | |
| JP | 2013-215021 | 10/2013 | | |
| JP | 2013-219322 A | 10/2013 | | |
| JP | 5444630 | 1/2014 | | |
| JP | 2015-032669 | 2/2015 | | |
| WO | 2007/119393 | 8/2009 | | |
| WO | 2012/176509 | 12/2012 | | |
| WO | WO-2013137134 A1 | * 9/2013 | ................ | B22F 3/18 |
| WO | 2013/175730 | 11/2013 | | |
| WO | 2015-015586 A1 | 2/2015 | | |

OTHER PUBLICATIONS

WO-2013137134-A1 translated. (Year: 2013).*
Hedrick A., Die Science: Stamping 101—Die basics, Jan. 15, 2008, Stamping Journal, 1-3. (Year: 2008).*
Monroe, Piercing vs Punching vs Blanking: How they differ, Jun. 28, 2019, <https://monroeengineering.com/blog/piercing-vs-punching-vs-blanking-how-they-differ/> accessed May 11, 2020. (Year: 2019).*
JP-2011109004-A english translation. (Year: 2011).*
English Translation of the Written Opinion of the International Searching Authority dated Jun. 21, 2016, which issued during prosecution of International Application No. PCT/JP2016/059393.
Japanese Office Action dated Sep. 9, 2019 for corresponding Japanese Application No. 2017-508423.
Japanese Office Action dated Sep. 17, 2019 for corresponding Japanese Application No. 2017-508424.
Chinese Office Action dated May 17, 2019 for corresponding Chinese Application No. 201680017831.7.
Japanese Office Action dated Jun. 10, 2019 for corresponding Japanese Application No. 2017-508425 with English Translation.
International Search Report dated Jun. 21, 2016, which issued during prosecution of International Application No. PCT/JP2016/059393.
Une, et al. "Enhancement of Coercivity of Nd—Fe—B Sintered Magnets by Grain Size Reduction" J. Japan Inst. Metals, 2012, 76(1):12-16.
The extended European search report for corresponding European application No. 16768881.1 dated Nov. 29, 2018.
Japanese Office Action dated Aug. 26, 2019 for corresponding Japanese Application No. 2017-508422.
Japanese Office Action dated Feb. 28, 2020 corresponding to Japanese Application No. 2018-101818.
Japanese Office Action dated Jun. 1, 2020 corresponding to Japanese Patent Application No. 2017-508422 with English machine translation.
Japanese Office Action dated Jun. 1, 2020 corresponding to Japanese Patent Application No. 2017-508423 with English machine translation.
Japanese Office Action dated Jun. 1, 2020 corresponding to Japanese Patent Application No. 2017-508424 with English machine translation.

(56) References Cited

OTHER PUBLICATIONS

Office Action issued in corresponding Japanese Patent Application No. 2018-101818 dated Oct. 1, 2020, along with an English machine translation.

* cited by examiner (a)

(b)

(a)

(b)

(c)

(d)

(a)

(b)

(a)

(b)

(c)

(a)

(b)

(a)

(b)

(c)

(a)

(b)

METHOD FOR PRODUCING SINTERED BODY THAT FORMS RARE-EARTH PERMANENT MAGNET AND HAS NON-PARALLEL EASY MAGNETIZATION AXIS ORIENTATION

RELATED APPLICATIONS AND INCORPORATION BY REFERENCE

The present patent application is filed pursuant to 35 U.S.C. § 371 as a U.S. National Phase Application of International Patent Application No. PCT/JP2016/059393 filed Mar. 24, 2016, claiming the benefit of priority to Japanese Patent Application Nos. 2016-039116 filed Mar. 1, 2016; 2016-039115 filed Mar. 1, 2016; 2016-022770 filed Feb. 9, 2016; 2015-151761 filed Jul. 31, 2015; 2015-122734 filed Jun. 18, 2015; 2015-061081 filed Mar. 24, 2015 and 2015-061080 filed Mar. 24, 2015. The International Application was published as WO 2016/152978 on Sep. 29, 2016. The contents of each of the aforementioned patent applications are herein incorporated by reference in their entirety.

TECHNICAL FIELD

The present invention relates to a method for producing a sintered body for forming a rare-earth magnet. More particularly, the present invention relates to a method for producing a rare-earth magnet-forming sintered body having regions wherein easy magnetization axes in the respective regions are oriented in non-parallel directions each other.

BACKGROUND ART

A rare-earth magnet has been recognized and put into practical use as a high performance permanent magnet since a high coercivity and residual flux density can be expected. In view of the situation, efforts are now continued for a still further development to obtain a further improvement. For example, in an article in the Journal of the Japan Society of Metallurgy, Vol. 76, No. 1, pp 12 to 16, by Yasuhiro UNE entitled "Enhancement of Coercivity in Nd—Fe—B Based Sintered Magnet through use of Finer Crystal Particles" (Non-Patent Document 1), describes, based on the recognition that it has been well known that the coercivity of a magnet can be increased by decreasing particle size of magnet materials, an example wherein magnet-forming material particles of an average particle size of 1 µm are used for manufacturing a rare-earth sintered magnet in order to increase the coercivity of an Nd—Fe—B type sintered magnet. In the method for manufacturing a rare-earth sintered magnet described in the non-patent document 1, a mixture of magnet material particles and a lubricant comprising a surface reactant is charged in a carbon mold which is fixed in a hollow core coil, and a pulsating magnetic field is applied to have the magnet material particles oriented. However, with this method, the orientation of the magnet material particle is determined only by the pulsating magnetic field applied by the hollow core coil, so that it is impossible to obtain a permanent magnet having magnet material particles oriented in any desired direction in different positions in the magnet.

JP H6-302417A (Patent Document 1) discloses a method of producing a permanent magnet having a plurality of regions wherein magnet materials in respective regions have easy magnetization axes oriented respectively in different directions. According to the method disclosed in the patent document 1, a plurality of magnet bodies having easy magnetization axes of magnet material particles respectively oriented in different directions are joined together in producing rare-earth permanent magnet including a rare-earth element R, Fe and B as basic constituent elements. The method described in the patent document 1 makes it possible to produce a rare-earth permanent magnet including a plurality of regions having easy magnetization axes of magnet material particles oriented respectively in desired different directions in respective regions. However, the magnet producing method described in the patent document 1 is not practical since the method requires a lot of time and labor for producing a magnet having a complicated orientation pattern. Further, according to the method, a plurality of magnet bodies are joined together with an adhesive, so that the resultant magnet has a weak mechanical strength. It should further be pointed out that the magnet produced by this method will have a lower magnetic property as the number of magnet bodies increases.

JP 2006-222131A (Patent Document 2) discloses a method for producing an annular rare-earth permanent magnet by arranging and connecting an even number of permanent magnets in a circumferential direction. According to the method for producing rare-earth permanent magnet described in the patent document 1, a sector-shaped permanent magnet piece having a pair of sector-shaped major surfaces and a pair of side surfaces is formed in a particle pressing apparatus having a correspondingly sector-shaped cavity. In the method, particles of rare-earth alloy are charged in the sector-shaped cavity and pressed by a pair of punches which are provided with orienting coils while orienting magnetic field is being applied to the particles of the magnetic materials. With this process, there is produced a permanent magnet piece having a radial polar anisotropy between N pole and S pole on the respective major surfaces. Specifically, it is possible to produce a permanent magnet having an orientation of magnetization with a magnetization direction curved in an arcuate configuration from a corner wherein one of the major surface intersects with one of the side surfaces toward the other major surface and from the other major surface toward a corner wherein the one major surface intersects with the other of the side surfaces. An even number of such permanent magnet having radial polar anisotropy in magnetization direction are joined to form an annular shape such that the each two adjacent permanent magnet pieces have mutually opposite polarity. The method for producing a permanent magnet described in the patent document 2 is limited to a manufacture of a magnet having a polar anisotropy in directions of magnetization, so that the method described in the patent document 2 cannot produce a magnet wherein magnet material particles are oriented in different, desired directions in different locations.

The patent document 2 further discloses an arrangement of magnet pieces wherein, among even number of sector-shaped magnet pieces, those having axial orientation of magnetization and those having radial orientation of magnetization are alternately arranged. There is described that, with this arrangement, it is possible to have magnetic flux concentrated in the pole of one major surface of one axially magnetized magnet piece and further have the magnetic flux from the pole of the one magnet piece efficiently converged to one major surface of the other axially magnetized magnet piece, by arranging the axially magnetized magnet pieces and the radially magnetized magnet pieces such that the alternately arranged axially magnetized magnet pieces have opposite polarity at the major surfaces, and the radially magnetized magnet piece between the two axially magnetized magnet pieces has polarity identical with the opposed polarity in the adjacent axially magnetized magnet piece. However, even with this suggested arrangement, attainable orientations of magnetization are limited, so that it is difficult to produce a permanent magnet having orientations of magnetization in variety of directions.

It should further be pointed out that the magnet obtained by the method described in the patent document 2 has a structure wherein a plurality of magnet pieces are adhesively joined together, so that it has a decreased mechanical strength. Further, the magnet produced by this method will have a lower magnetic property as the number of magnet bodies increases.

JP 2015-32669A (Patent Document 3) and JP H6-244046A (Patent Document 4) both disclose a method for forming a rare-earth permanent magnet having radial orientation of magnet material particles. The method comprises steps of press forming magnet material particles containing rare-earth elements R, Fe and B to form a flat panel pressed body, applying parallel magnetic field to the pressed body to effect orientation under a magnetic field, sintering at a sintering temperature to form a sintered magnet, then press forming the sintered magnet into an arcuate shape under a temperature condition with a die having an arcuate pressing portion. Both the patent documents 3 and 4 disclose a method for forming a magnet having a radially oriented magnet material particles by using a parallel magnetic field, however, since the press forming process for bending the flat panel shape to the arcuate shape is conducted after the sintering step, there will be difficulty in such forming so that it will be impossible to apply the step to a process for producing a large or a complicated deformation. Therefore, the process taught by either the patent document 3 or patent document 4 is limited to that for forming a magnet having a radial orientation as disclosed in the documents.

JP5444630B (Patent Document 5) discloses a flat panel-shaped permanent magnet for use in an embedded magnet type motor. The permanent magnet disclosed in the patent document 5 has a radial orientation of easy magnetization axes wherein inclination angles of the easy magnetization axes in a cross-section of the magnet continuously change from widthwise opposite end portions to a widthwise central portion. More specifically, the easy magnetization axes of the magnet are oriented such that they converge to one point on an imaginary line extending in a cross-section of the magnet from the central portion in a thickness direction. As regards a method for producing such a permanent magnet having a radial orientation of the easy magnetization axes, the patent document 5 describes that it is readily possible to produce such magnet with application of a magnetic field which can be easily applied during shaping of the magnet. The method taught by the patent document 5 is to apply a magnetic field which is converged to one point located externally of the magnet during shaping of the magnet, so that the method is limited to a manufacture of a magnet having radially oriented easy magnetization axes. Therefore, the method cannot produce a magnet having a different orientation pattern, such as a magnet having an orientation wherein the easy magnetization axes are oriented in parallel each other in a widthwise central region along a direction of the thickness, but oriented obliquely in widthwise end regions.

JP 2005-44820A (Patent Document 6) discloses a method for producing a rare-earth sintered ring-shaped magnet having an anisotropy polarity which is substantially free of cogging torque when it is incorporated in a motor. The rare-earth sintered ring-shaped magnet is magnetized such that it has magnetic poles at a plurality of circumferentially spaced apart positions, and a radially oriented direction of magnetization in the position of the magnetic pole but circumferentially oriented direction of magnetization in a position between each two adjacent magnetic poles. The method for producing a rare-earth sintered ring-shaped magnet described in the patent document 6 is limited to a manufacture of a magnet having an anisotropy polarity, but it cannot produce a magnet having different directions of orientation in any different regions of the magnet.

JP 2000-208322A (Patent Document 7) discloses a panel-like, sector-shaped one-piece permanent magnet having different orientations of magnet material particles in a plurality of regions. According to the patent document 7, a permanent magnet is formed with a plurality of regions, wherein in one of the regions, the magnet material particles are oriented in pattern parallel with a direction of thickness, but in a region adjacent to the one region, the magnet material particles are oriented with an angle with respect to the orientation of the magnet material particles in the one region. The patent document 7 describes that a permanent magnet having the aforementioned orientation of the magnet material particles can be produced by adopting a powder metallurgy and die forming under pressing force through application of a magnetic field in an appropriate direction. However, the method for forming a permanent magnet described in the patent document 7 is only applicable to a production method of a magnet having a specific orientation direction and the shape of the magnet produced by this method is also limited.

WO 2007/119393 (Patent Document 8) discloses a method for manufacturing a permanent magnet having non-parallel orientation of magnet material particles, by forming a mixture of magnet material particles and a binder into a desired shape to produce a shaped body, applying a parallel magnetic field to the shaped body to produce parallel orientation of the magnet material particles, and deforming the shaped body into a different shape to change the orientation of the magnet material particles into a different pattern. The magnet disclosed in the patent document 8 is a so-called bond magnet wherein the magnet material particles are bonded together by the binder composition, and is not a sintered magnet. A bond magnet is of a structure wherein a plastic material is interposed between the magnet material particles so that it has a magnetic property inferior to that of a sintered magnet. Thus, the method cannot produce a high performance magnet.

JP 2013-191612A (Patent Document 9) discloses a method for forming a rare-earth sintered magnet comprising steps of forming a mixture of magnet material particles and a binder into a sheet configuration to form a green sheet, applying a magnetic field to the green sheet to carry out an orienting process under a magnetic field, subjecting the oriented green sheet to a calcination treatment to dissolve and dissipate the plastic binder, and sintering the sheet under a sintering temperature. The sintered magnet produced by the method described in the patent document 9 has a structure wherein the easy magnetization axes are oriented in one direction, so that the method cannot produce a one-piece permanent magnet having different orientations of magnet material particles in a plurality of regions.

CITATION LIST

[Parent Document]
Patent Document 1: JP H6-302417A
Patent Document 2: JP 2006-222131A
Patent Document 3: JP 2015-32669A Patent Document 4: JP H6-244046A
Patent Document 5: JP5444630B
Patent Document 6: JP 2005-44820A
Patent Document 7: JP 2000-208322A
Patent Document 8: WO 2007/119393
Patent Document 9: JP 2013-191612A
Patent Document 10: U.S. Pat. No. 5,705,902
Patent Document 11: JP 2013-215021A
Non-Patent Document 1: The Japan Society of Metallurgy, Vol. 76, No. 1, pp 12 to 16, by Yasuhiro UNE entitled "Enhancement of Coercivity in Nd—Fe—B Based Sintered Magnet through use of Finer Crystal Particles"

SUMMARY OF INVENTION

Technical Problem

It is a primary object of the present invention is to provide a method for producing a rare-earth magnet-forming sintered body of an integral sintered structure which is of any shape and has a plurality of regions respectively containing magnetic material particles having easy magnetization axes oriented in different directions in different regions.

Solution to Technical Problem

In order to accomplish the above object, in a first aspect, the present invention provides a method for producing a rare-earth magnet-forming sintered body wherein a number of magnet material particles including rare-earth substances and each having an easy magnetization axis are integrally sintered. The method includes a first shaped body forming step for forming a first shaped body from a compound material provided by mixing the magnet material particles with a resin material into a three dimensional shape which has a lengthwise dimension in a lengthwise direction, a thickness dimension defined between a first surface and a second surface in a thickness direction in a cross-section perpendicular to the lengthwise direction, and a widthwise dimension taken in a widthwise direction which is perpendicular to the thickness direction.

The method in accordance with the above described aspect of the present invention further includes an orientation step for orienting the easy magnetization axes of the magnet material particles by applying to the first shaped body an external parallel magnetic field comprising a parallel magnetic flux, to have the easy magnetization axes of the magnet material particles oriented in a direction parallel with the direction of the magnetic field, and a second shaped body forming step for forming a second shaped body made by deforming the first shaped body such that at least a portion of the first shaped body is changed in shape in the cross-section to thereby change the orientations of the easy magnetization axes of the magnetic material in the at least a portion in the cross-section to a direction different from the direction in the first shaped body.

The second shaped body is then subjected to a sintering step wherein the second shaped body is heated to a sintering temperature and held in the sintering temperature for a predefined time. Thus, the resin material in the second shaped body is dissipated and the magnet material particles are sintered together. The applied magnetic field may be directed along the cross-section of the first shaped body from the first surface to the second surface.

In the method for producing a rare-earth magnet-forming sintered body, the resin material contained in the compound is preferably a thermoplastic resin material. The sintering temperature may be 800° C. to 1200° C. It is preferred that the sintering step is carried out with a pressing force applied to the second shaped body in the lengthwise direction. In this case, the pressing force applied to the second shaped body is controlled in the range between 0.01 MPa and 100 MPa, and the pressing force is applied continuously or intermittently. It is further preferable that the sintering step is carried out in an atmosphere of 15 MPa or less, with a temperature raised up to the predefined sintering temperature at a temperature raising rate of 3° C./min to 100° C./min, and the pressing force applied to the second shaped body in the sintering step is maintained until the dimensional change of the second shaped body in the direction of pressing force becomes substantially 0. In a more preferable aspect, the sintering step is carried out under an atmosphere of reduced pressure of 6 Pa or less, by raising the temperature up to a predefined sintering temperature at a temperature raising rate of 3° C./min to 30° C./min, and the pressing force applied to the second shaped body in the sintering step is maintained until the dimensional change of the second shaped body in the direction of pressing force becomes substantially 0. In the description, the term "reduced pressure" is used to mean a pressure of 6 Pa or less, and it is preferable that the reduced pressure is 0.1 Pa or less, more preferably 0.01 Pa or less.

In the method of the present invention, it is possible, after the second shaped body forming step and before the sintering step, to carry out a calcining step for removing carbon, by heating the second shaped body in a hydrogen atmosphere to have the carbon content in the thermoplastic resin contained in the second shaped body reacted with the hydrogen. The calcining step is preferably conducted at a temperature raising rate of 10° C./min or less. The calcining step is preferably carried out under a temperature in a temperature range of 250° C. to 600° C., more preferably 300° C. to 600° C. The calcining step is preferably conducted under a pressure of 0.1 MPa to 70 MPa.

In the method for producing a rare-earth magnet-forming sintered body in accordance with the present invention, the magnet material particles have an average size or diameter of 6 μm or less. It is preferable that the magnet material particles are produced in an inert gas atmosphere having an oxygen concentration of 0.5% or less. Further, the thermoplastic resin is preferably a polymer which does not contain oxygen in its structure. Further, it is preferable that the thermoplastic resin is a polymer which comprises one or more polymers or copolymers formed from a monomer represented by the following general formula (1):

(where each of R1 and R2 denotes one of a hydrogen atom, a lower alkyl group, a phenyl group and a vinyl group.)

In the method in accordance with the present invention, the thermoplastic resin may be selected from a group including: polyisobutylene (PIB); polyisoprene (isoprene rubber (IR)); polypropylene; a poly (α-methylstyrene) polymerized with α-methylstyrene; polyethylene; polybutadiene (butadiene rubber (BR)); polystyrene; a styrene-isoprene-styrene block copolymer (SIS); butyl rubber (IIR); a styrene-butadiene-styrene block copolymer (SBS); a styrene-ethylene-butadiene-styrene copolymer (SEBS); a styrene-ethylene-propylene-styrene copolymer (SEPS); an ethylene-propylene copolymer (EPM); EPDM obtained by copolymerizing diene monomers together with ethylene and propylene; a 2-methyl-1-pentene polymerized resin as a polymer of 2-methyl-1-pentene; and a 2-methyl-1-butene polymerized resin as a polymer of 2-methyl-1-butene.

The thermoplastic resin is preferably of the one which has a glass transition temperature or fluidity starting temperature of 250° C. or lower. Further, it is preferable that the thermoplastic resin does not contain oxygen atom, nitrogen atom and other hetero-atoms.

In a specific aspect of the method for producing a rare-earth magnet-forming sintered body, the first shaped body formed in the first shaped body forming step has a straight central region, end regions contiguous with and provided at the opposite end portions of the central region, wherein the each of the end regions is of an arcuate configuration with the second surface being of a convex shape and first surface being of a concave shape and, in the second shaped body forming step, each of the end regions contiguous with the corresponding end portion of the central region is deformed to be straight with the corresponding end portion of the central region. Therefore, the orientations of the easy magnetization axes in the second shaped body become such that, in the central region, the easy magnetization axes are oriented in the thickness direction from the first surface to the second surface to provide a parallel orientation, whereas in the end regions, the easy magnetization axes are oriented to converge widthwise inwards from the first surface to the second surface.

Alternatively, the first shaped body formed in the first shaped body forming step may have a configuration of an arc with the second surface being of a convex shape and the first surface being a concave shape, and in the second shaped body forming step, the first shaped body may be deformed into a straight shape or into a configuration of an arc having a radius of curvature larger than that of the first shaped body, so that the easy magnetization axes of the second shaped body are oriented to converge widthwise inwards from the first surface to the second surface. Further, the first shaped body formed in the first shaped body forming step may have a configuration of an arc with the second surface being of a concave shape and the first surface being a convex shape, and in the second shaped body forming step, the first shaped body may be deformed into a straight shape or into a configuration of an arc having a radius of curvature larger than that of the first shaped body, so that the easy magnetization axes of the second shaped body are oriented to spread widthwise outwards from the first surface to the second surface.

In another aspect of the present invention, the resin material is a thermoplastic resin material, and the first shaped body is of a configuration having a cross-section of an elongated rectangle with a pair of long sides, and a pair of short sides perpendicular to the long side. An external magnetic field is applied in a direction perpendicular to the long side, and the first shaped body is deformed so that the long side forms an annular shape. The end portions are welded together by melting the materials in the end portions to form a second shaped body. In this case, the external magnetic field applied to the first shaped body is directed from the first surface to the second surface, and the second shaped body is formed by deforming the first shaped body such that the first surface is radially inside of the annular shape. Then, the easy magnetization axes of the magnet material particles contained in the second shaped body is oriented in radial directions to provide a radial orientation.

In a similar manner to the aspect of forming the radially oriented second shaped body, it is possible to form a second shaped body having an axial orientation wherein the easy magnetization axes of the magnet material particles are oriented in an axial direction. Then, radially oriented sintered bodies and axially oriented sintered bodies respectively produced from corresponding second shaped bodies are combined together by arranging the radially oriented sintered bodies and the axially oriented sintered bodies alternately one from the other, to provide a sintered body of a Halbach arrangement. In this case, the method for producing an axially oriented sintered body may include steps of applying an external magnetic field to the first shaped body in a direction from the first surface to the second surface in the cross-section of the first shaped body, and forming the second shaped body by deforming the first shaped body such that the first and second surfaces form annular shapes which are parallel with each other and the easy magnetization axes of the magnet material particles in the second shaped body are axially oriented to provide an axial orientation. In the method for forming a rare-earth magnet-forming sintered body in accordance with the present invention, the firs shaped body may be provided by forming a compound into a sheet, and cutting the sheet into a desired shape.

The rare-earth permanent magnet-forming sintered body is magnetized in a later-described process to provide a rare-earth permanent magnet.

Effect of Invention

As described, according to the method for forming a rare-earth magnet-forming sintered body, a compound is formed by mixing magnet material particles containing rare-earth substances and a resin material, and the compound is used to form a first shaped body of a three-dimensional configuration having a lengthwise dimension in a lengthwise direction, a thickness dimension in a thickness direction between a first surface and a second surface in a cross-section perpendicular to the lengthwise direction, and a widthwise dimension in a widthwise direction perpendicular to the thickness direction. Then, an external parallel magnetic field is applied to the first shaped body while maintaining the first shaped body at a temperature higher than a softening temperature of the resin material along the cross-section in a direction from the first surface to the second surface, to thereby orient easy magnetization axes of the magnet material particles in a direction parallel to the direction of the external magnetic field. Therefore, it is possible to have the easy magnetization axes of the magnet material particles oriented accurately. Further, the first shaped body having the easy magnetization axes of the magnet material particles oriented in parallel is subjected to a deformation to have at least a portion in the cross-section of the first shaped body deformed, so that it is possible to form a second shaped body wherein orientations of the easy magnetization axes of the magnet material particles in the deformed portion are changed from those in the first shaped body. Therefore, it is possible to provide a second shaped body of a desired configuration with desired orientations of the easy magnetization axes in the second shaped body by appropriately determining the initial configuration of the first shaped body.

It is further to be noted that according to the method of the present invention, any resin material contained in the compound is dissipated during the sintering process of the second shaped body, so that in the final sintered magnet has a structure wherein the magnet material particles are sintered together. Thus, although use is made of a compound formed by mixing magnet materials and a resin material, the magnet as a final product is substantially free from resin materials, so that the density of the magnet material particles can be kept at a high value. Therefore, a rare-earth permanent magnet obtained by magnetizing the rare-earth magnet-forming sintered body produced by the method of the present invention can provide a superior magnetic property.

Embodiments of the present invention will now be described with reference to the drawings.
three dimensional shape is of a configuration having a cross section perpendicular to the lengthwise direction of an arcuate shape wherein the first and second surfaces are of annular shape having a common center of arc.

DESCRIPTION OF EMBODIMENTS

Before the description is made on embodiments, description will be made with respect to the definitions of terms and measurements of orientation angles.

[Orientation Angle]

The term "orientation angle" herein means an angle of the direction of an easy magnetization axis of a magnet material particle with respect to a predefined reference line.

[Axis Orientation Angle]

The term "axis orientation angle" herein means a most frequently appearing orientation angle among orientation angles of a plurality of magnet material particles contained in a predefined discrete area in any specific position in a plane of magnet. In the present invention, the discrete area for determining the axis orientation angle is a rectangular area containing the magnet material particles in number of at least 30, or a square having a length of 35 μm in each side.

Figure 14:
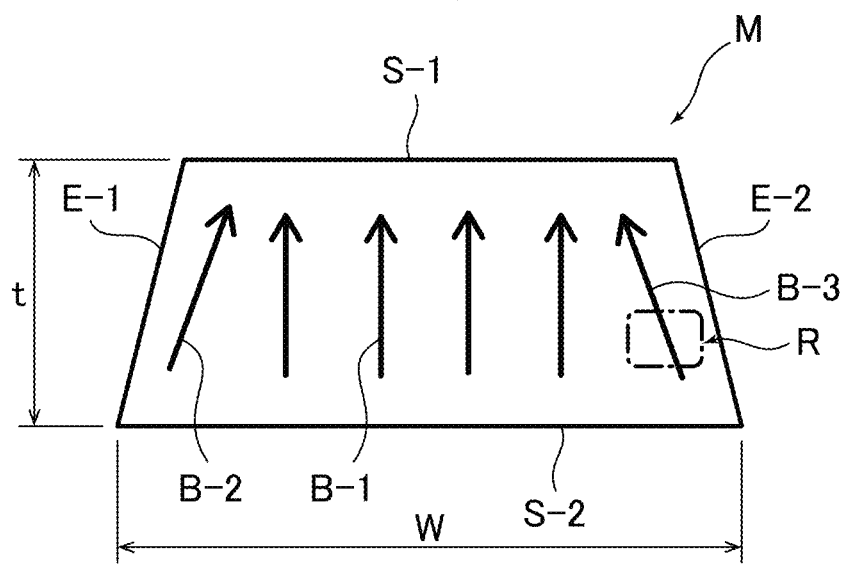
FIG. 14 is a diagrammatic end view showing orientation angles and an axis orientation angle, wherein (a) shows an example of orientations of easy magnetization axes of magnet material particles in a rare-earth magnet, and (b) is an enlarged illustration of magnet material particles, particularly showing "orientation angles" of easy magnetization axes and a manner of determining "axis orientation angle"
Figure 14:
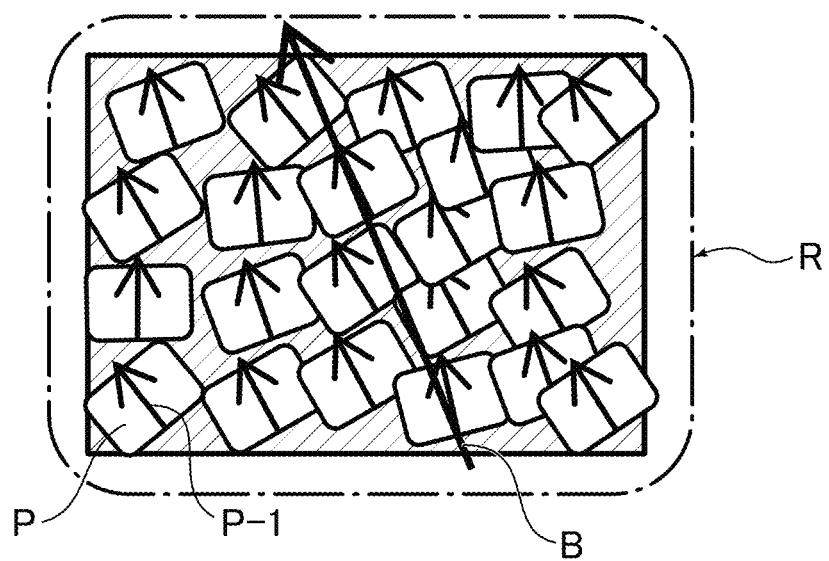

Referring now to FIG. 14, there are shown an orientation angle and an axis orientation angle. FIG. 14(a) is a cross-sectional view showing an example of orientation of easy magnetization axes of magnet material particles, wherein the rare-earth magnet M has a first surface S-1, a second surface S-2 apart from the first surface by a distance corresponding to a thickness t, and a width w, end surfaces E-a and E-2 being formed in widthwise opposite end portions. In the illustrated embodiment, the first surface S-1 and the second surface S-2 are planar surfaces which are parallel with each other. In the illustrated sectional view, the first surface S-1 and the second surface S-2 are designated by two mutually parallel straight lines. The end surface E-1 is slanted in up and right direction with respect to the first surface S-1, and the end surface E-2 is similarly slanted up and left direction with respect to the second surface S-2. An arrow B-1 is shown as indicating an orientation axis or direction of an easy magnetization axis of a magnet material particle in a widthwise central region of the rare-earth magnet M. To the contrary, an arrow B-2 shows an orientation axis or direction of an easy magnetization axis of a magnet material particle in a region adjacent to the end surface E-1. Similarly, an arrow B-3 shows an orientation axis or direction of an easy magnetization axis of a magnet material particle in a region adjacent to the end surface E-2.

The "axis orientation angle" is an angle between the orientation axis indicated by the arrow B-1, B-2 or B-3 and a reference line. The reference line can be arbitrary defined, but in a case where the section of the first surface S-1 is designated by a straight line such as an example shown in FIG. 14(a), it is convenient to adopt the first surface as the reference line. FIG. 14(b) is a grammatical enlarged illustration showing an "orientation angle" of the easy magnetization axis of each magnet material particle and the manner of determining an "axis orientation angle". An arbitrary portion, for example a rectangular area R shown in FIG. 1(a) is shown in FIG. 1(b) in an enlarged scale. The rectangular area R contains a number of magnet material particles P such as not less than 30, for example, 200 or 300 pieces of magnet material particles P. If the number of magnet material particles contained in the rectangular area is large, the accuracy of measurement is enhanced, however, even with the number of 30, it is possible to conduct a measurement with a sufficient accuracy. Each of the magnet material particles P has an easy magnetization axis P-1. The easy magnetization axis does not usually have any directionality, but when the particle is magnetized, a vector having a directionality is produced. In FIG. 14(b), the easy magnetization axis is shown as having a directionality considering a polarity in which the particle is to be magnetized. In the following description, the term "direction of orientation of an easy magnetization axis" or a similar term is used to designate a direction determined taking consideration to the polarity after magnetization.

As shown in FIG. 14(b), the easy magnetization axis P-1 of each magnet material particle P has an "orientation angle" which is an angle between the direction of the easy magnetization axis and a reference line. The "axis orientation angle" B is then defined as a most frequently appearing angle among the "orientation angles" of the easy magnetization axes P-1 of the magnet material particles P in the rectangular area R shown in FIG. 14(b).

[Deviation Angle of Orientation Angle]

Figure 2:
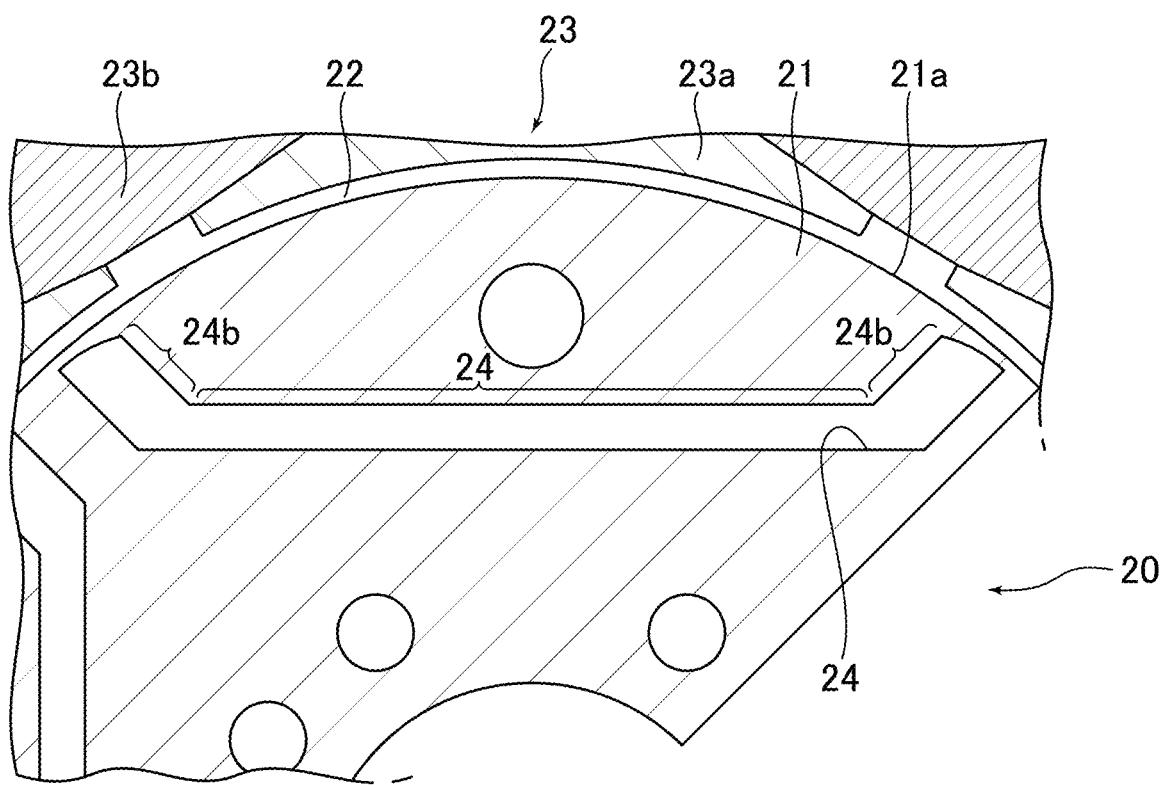
FIG. 2 is a fragmentary sectional view of a rotor of an electric motor showing an example of a slot for insertion of a rare-earth magnet in accordance with one embodiment of the present invention.
Figure 15:
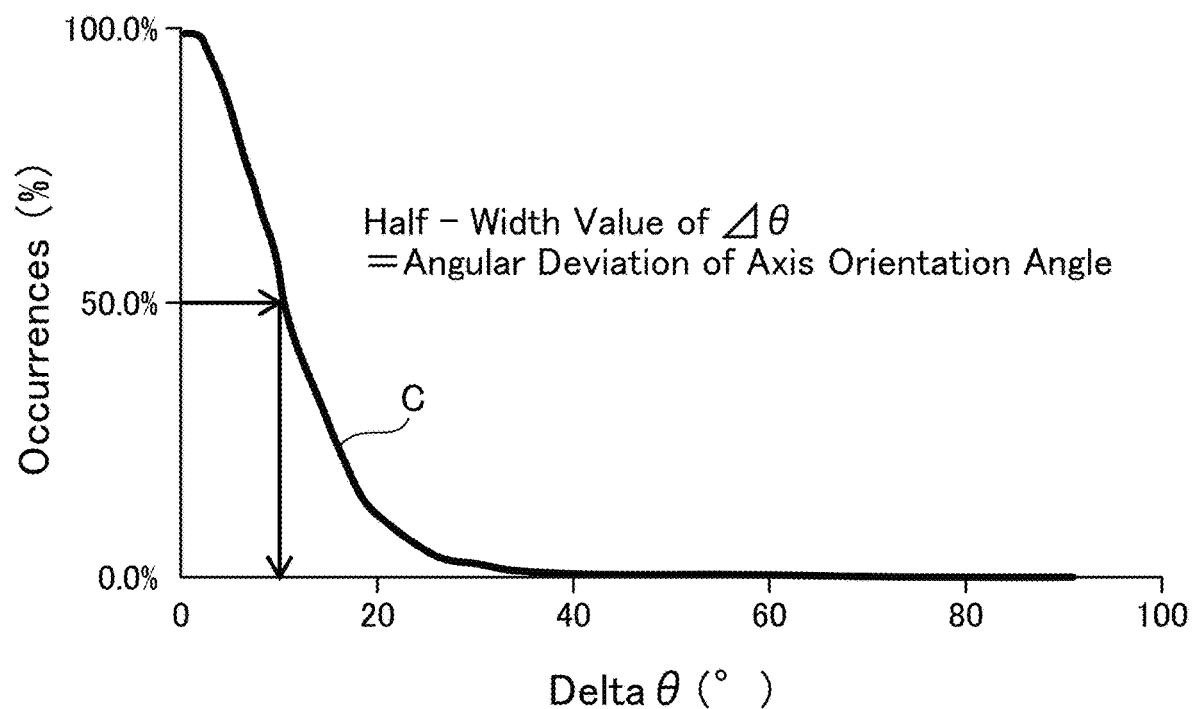
FIG. 15 is a graph showing a manner of determining an orientation angle deviation.

In any rectangular area, the axis orientation angle is determined and, for all of the magnet material particles existing in the particular rectangular area, differences between the orientation angles and the axis orientation angle are determined. Then, distributions of the differences are drawn in a graph in terms of number of occurrences and the angle values of the differences. A half-value width is then determined in the graph as the orientation deviation angle. In FIG. 2, there is shown a graph for use in determining an orientation deviation angle. Referring to FIG. 15, there is shown by a curve C a distribution of the difference $\Delta\theta$ between each of the easy magnetization axes of the magnet material particles and the axis orientation angle. In a vertical axis, the position of the maximum number of occurrence is shown as 100%, and a value of the difference $\Delta\theta$ corresponding to a 50% of number of occurrence is taken as the half-value width.

[Measurement of Orientation Angle]

Figure 16:
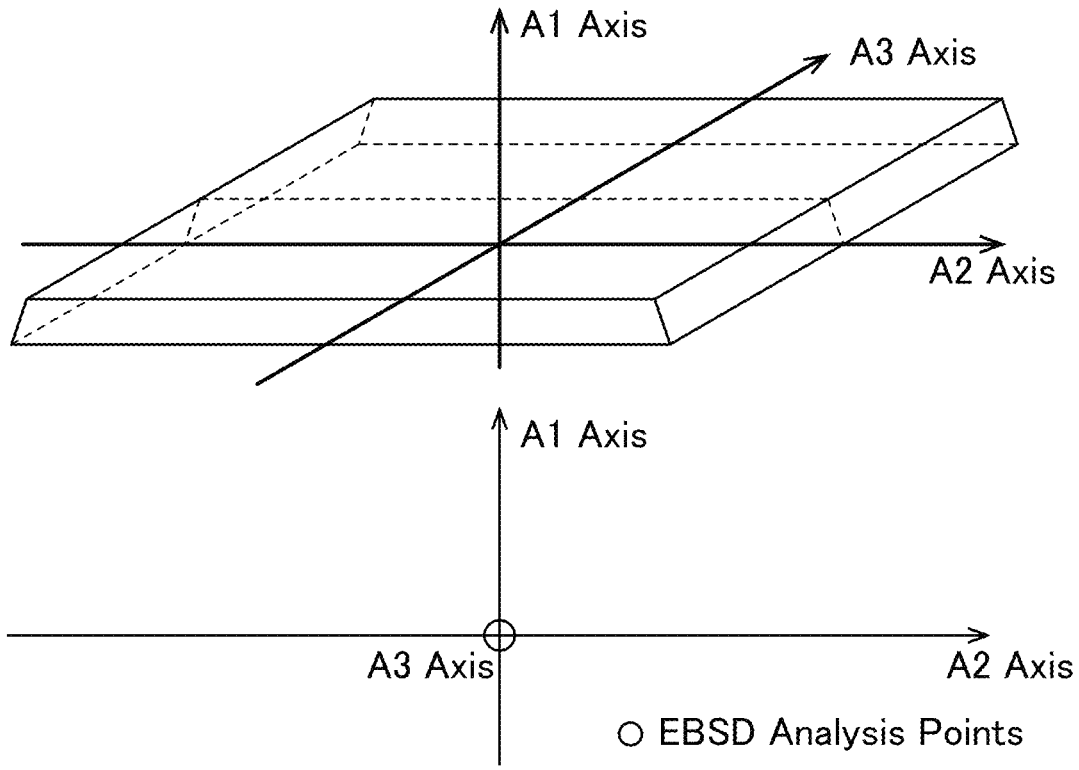
FIG. 16 shows a distribution of orientation angles based on an EBSD analysis, wherein (a) is a perspective view of coordinate axes taken in a rare-earth magnet, (b) shows examples of polar point diagrams at a central portion and the opposite end portions as obtained by the EBSD analysis: and (c) shows axis orientation angles in a section of the magnet taken along the A2 axis.
Figure 16:
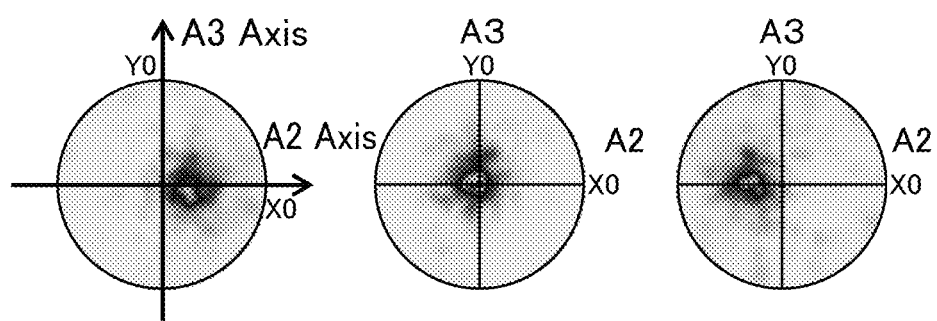
Figure 16:
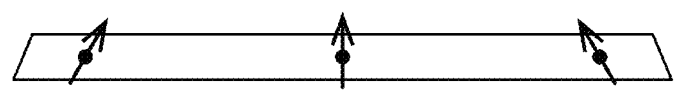

The orientation angle of the easy magnetization axis in each individual magnet material particle P can be determined by an "Electron Back Scattering Diffraction Analysis" (EBSD Analysis) based on images taken by a scanning electron microscope (SEM). Examples of devices which can be used for the analysis are Model JSM-70001F manufactured by Nihon Electron KK having head office in Akishima City, Tokyo, Japan which is incorporated with an EBSD Detector (AZtecHKL EBSD NordlysNano Integrated) manufactured by Oxford Instruments, and a scanning electron microscope Model SUPRA40VP manufactured by ZEISS which is incorporated with an EBSD detector (Hikari High Speed EBSD Detector) manufactured by EDAX Co. Further, as entities for taking charge of such analysis for an outside entity, there are JFE Techno-Research K.K. in Nihonbashi, Chuou City, Tokyo, Japan, and K. K. Nitto Analysis Center in Ibaraki City, Osaka, Japan. By adopting an EBSD analysis, it is possible to determine the oriented angle of the easy magnetization axis in each magnet material particle existing in any specified area. FIG. 16 shows an example of designating an orientation of an easy magnetization axis in accordance with EBSD analysis, wherein FIG. 16(a) illustrates reference axes taken in a rare-earth magnet, and FIG. 16(b) shows examples of polar point diagrams at a central portion and the opposite end portions as obtained by the EBSD analysis. Further, FIG. 16(c) shows axis orientation angles in a section of the magnet taken along the A2 axis. The axis orientation angle can be designated by dividing an orientation vector of an easy magnetization axis into a component in a plane containing the A1 and A2 axes, and another component in a plane containing A1 and A3 axes. The A2 axis extends in the widthwise direction, while the A3 axis extends in the thickness direction. The Figure shown in the center of FIG. 16(b) indicates that the easy magnetization axis is oriented in the widthwise central portion in a direction substantially along the A1 axis. Similarly, the figure in the right portion of FIG. 16(b) indicates that the orientation of the easy magnetization axis is slanted in the right hand end portion from bottom toward left, upper direction along the plane containing the A1 and A2 axes. Such orientations are shown as orientation vectors in FIG. 16(c).

[Crystal Orientation]

It is possible to provide an illustration showing an inclination angle of the easy magnetization axis of each magnet material particle existing in any specified discrete area with respect to an axis perpendicular to a viewing plane, based on an image taken by a scanning electron microscope (SEM image).

Embodiments of the present invention will now be described with reference to the drawings. Referring to FIGS. 1 to 4, there are shown a rare-earth magnet-forming sintered body in accordance with an embodiment of the present invention, and an example of an electric motor incorporated with permanent magnets which are produced from the sintered body. The rare-earth magnet-forming sintered body 1 contains an Nd—Fe—B type magnet material as a magnet material. The Nd—Fe—B type magnet material may herein contain, for example, in weight percent, 27.0 to 40.0 wt. % of R (R represents one or more rare-earth elements including Y), 0.6 to 2 wt. % of B, and 60 to 75 wt. % of Fe. Typically, an Nd—Fe—B type magnet material contains 27 to 40 wt. % of Nd, 0.8 to 2 wt. % of B, and 60 to 75 wt. % of Fe which is an electrolytic iron. For the purpose of enhancing a magnetic property, such magnet material may contain small amounts of other elements such as Dy, Tb, Co, Cu, Al, Si, Ga, Nb, V, Pr, Mo, Zr, Ta, Ti, W, Ag, Bi, Zn, Mg, etc.

Referring to FIG. 1(a), it is to be noted that the magnet-forming sintered body 1 in accordance with this embodiment is formed from fine particles of the aforementioned magnet material by integrally sintering and shaping the particles of the magnet material. The sintered body 1 has an upper side 2 and a lower side 3 which are parallel with each other, and end surfaces 4 and 5 at the opposite end portions, the end surfaces being slanted with respect to the upper side 2 and the lower side 3. The upper side 2 is a side of a section corresponding to the second surface and the lower side 3 is a side of a section corresponding to the first surface. The slanted angles of the end surfaces 4 and 5 are defined as angles θ respectively between the upper side 2 and extension lines 4a and 5a of the end surfaces 4 and 5. In a preferable aspect, the slanted angle θ is in the range between 45° to 80°, more preferably between 55° to 80°. As the result, the magnet-forming sintered body 1 has a configuration having a trapezoidal shape with the upper side 2 being shorter than the lower side 3 in a widthwise section.

The magnet-forming sintered body 1 has a plurality of regions divided along the widthwise direction and including a central region 6 a predefined dimension, and end regions 7 and 8 at the opposite end portions. In the central region 6, the magnet material particles contained in the region 6 have easy magnetization axes oriented substantially perpendicular to the upper side 2 and the lower side 3 to provide a parallel orientation pattern. To the contrary, in the end regions 7 and 8, the magnet material particles contained in the regions 7 and 8 have easy magnetization axes slanted with respect to the thickness direction toward the central region 6 from bottom to upper direction. Specifically, the slanted directions at positions adjacent to the end surfaces 4 and 5 are along the slanted angles θ of the respective end surface 4 and 5, but in positions adjacent to the central region 6, the easy magnetization axes are directed substantially perpendicularly to the upper side 2, and the slanted angles gradually increase in positions closer to the central region 6 than in positions adjacent to the end surfaces 4 and 5. Such orientations of the easy magnetization axes are illustrated in FIG. 4(a) wherein the parallel orientation in the central region 6 is shown by arrows 9, and the orientations in the end regions 7 and 8 are shown by arrows 10. Describing the orientations in the end regions 7 and 8 in other terms, the easy magnetization axes of the magnet material particles contained in these regions 7 and 8 are oriented such that their directions are concentrated in predetermined ranges corresponding to the widthwise dimensions of the end regions 7 and 8 along the upper side 2 between corners where the upper side 2 intersects the respective end surfaces 4 and 5 and the border of the central region 6 and the respective end regions 7 and 8. As the results of such orientations, in the end regions 7 and 8, the density of the magnet material particles having easy magnetization axes oriented toward the upper side 2 becomes higher than that in the central region 6. According to a preferable aspect of the invention, the widthwise dimensions of the central region 6 and the end regions 7 and 8 are determined such that a parallel ratio P/L which is defined as a ratio of a parallel orientation length P to the widthwise dimension L of the upper side 2 is in a range of 0.05 to 0.8, more preferably in a range of 0.2 to 0.5.

Among the aforementioned orientations of the easy magnetization axes of the magnet material particles in the end regions 7 and 8, those in the end region 7 are shown in an exaggerated manner in FIG. 1(b). Referring to FIG. 1(b), the easy magnetization axis C of each magnet material particle is oriented with a slanted angle θ in a position adjacent to the end surface 4 substantially along the end surface 4. The slanted angle of the easy magnetization axis is then gradually increases in positions from the end portion toward the position closer to the central region 6. Specifically, the orientation of the easy magnetization axis C is patterned such that directions of the axes C are concentrated from the lower side 3 toward the upper side 2, so that the density of the magnet materials having the easy magnetization axes oriented toward the upper side 2 is larger than in a parallel orientation.

FIG. 2 is a sectional view in an enlarged scale of a rotor core portion in an electric motor 20 which is suitable for use rare-earth magnets produced by magnetizing the magnet-forming sintered body 1 having the aforementioned orientations of the easy magnetization axes. There is shown a rotor core 21 having a circumferential surface 21a and arranged in a stator 23 for rotation with the circumferential surface 21a opposed to the stator 23 with an air gap 22 formed between the surface 21a and the stator 23. The stator 23 is provided at circumferentially spaced positions with a plurality of teeth 23a each having a field coil wound thereon. The aforementioned air gap 22 is therefore formed between end surfaces of the teeth 23a and the circumferential surface 21a. The rotor core 21 is formed with magnet receiving slots 24, only one of the slots 24 being shown. The slot 24 has a straight central portion 24a, and a pair of oblique portions 24b which extend from the opposite end portions of the central portion 24a obliquely toward the circumferential surface 21a of the rotor core 21. As shown in FIG. 2, each of the oblique portions 24b has a terminal end portion located close to the circumferential surface 21a of the rotor core 21.

Figure 3:
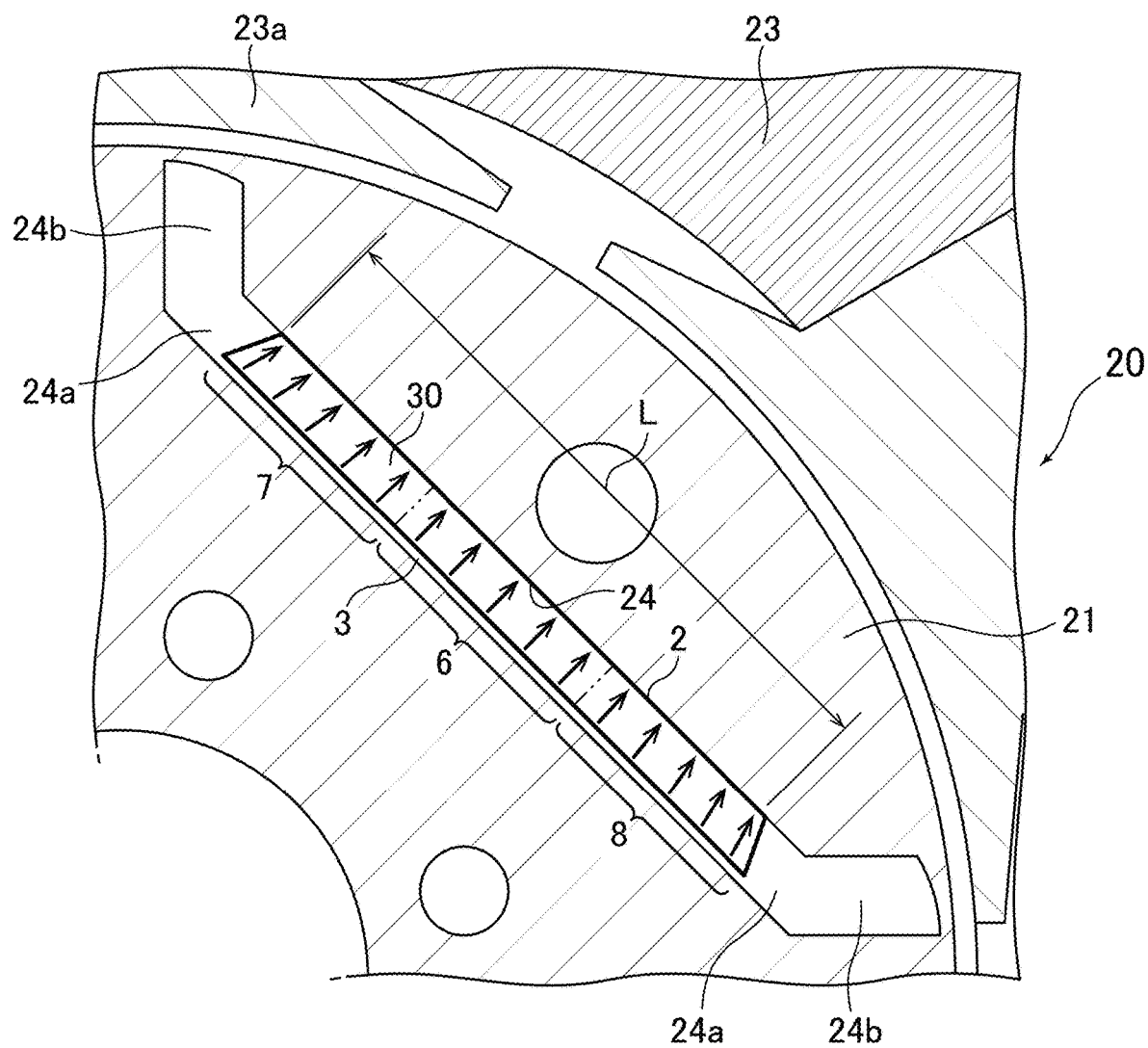
FIG. 3 is an end view of a rotor shown in FIG. 2 having a permanent magnet inserted thereto.
Figure 4:
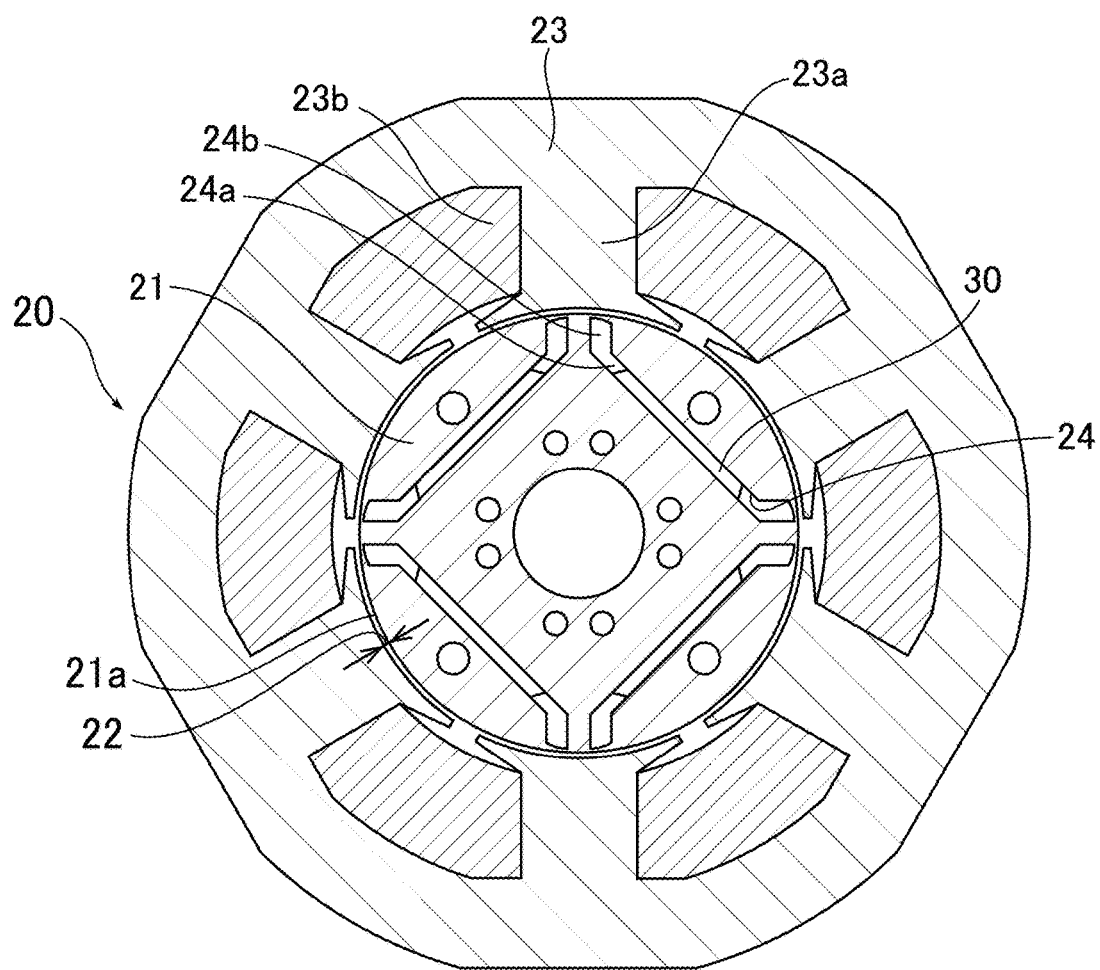
FIG. 4 is a cross-sectional view of an electric motor to which a permanent magnet of the present invention can be applied.

FIG. 3 shows a rare-earth magnet 30 obtained by magnetizing the magnet-forming sintered body 1 inserted into the magnet receiving slot 24 in the rotor core 21 shown in FIG. 2. As shown in FIG. 3, the rare-earth magnet 30 is inserted into the straight central portion 24a of the magnet receiving slot 24 formed in the rotor core 21 with the upper side 2 directed outwardly, namely, with the upper side 2 faced toward the stator 23. At portions outwards the opposite end portions of the inserted magnet 30, there are left gap portions which are comprised of portions of the straight central portion 24a and the oblique portions 24b. An overall view of the electric motor 20 having the permanent magnets inserted into the slots 24 of the rotor core 21 is shown in FIG. 4.

Figure 5:
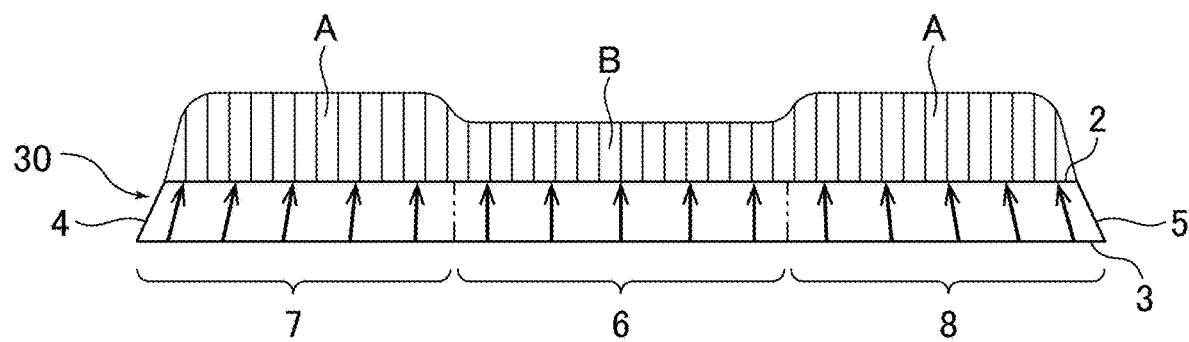
FIG. 5 is a diagram showing a distribution of magnetic flux density in the embodiment shown in FIG. 1.
Figure 8:
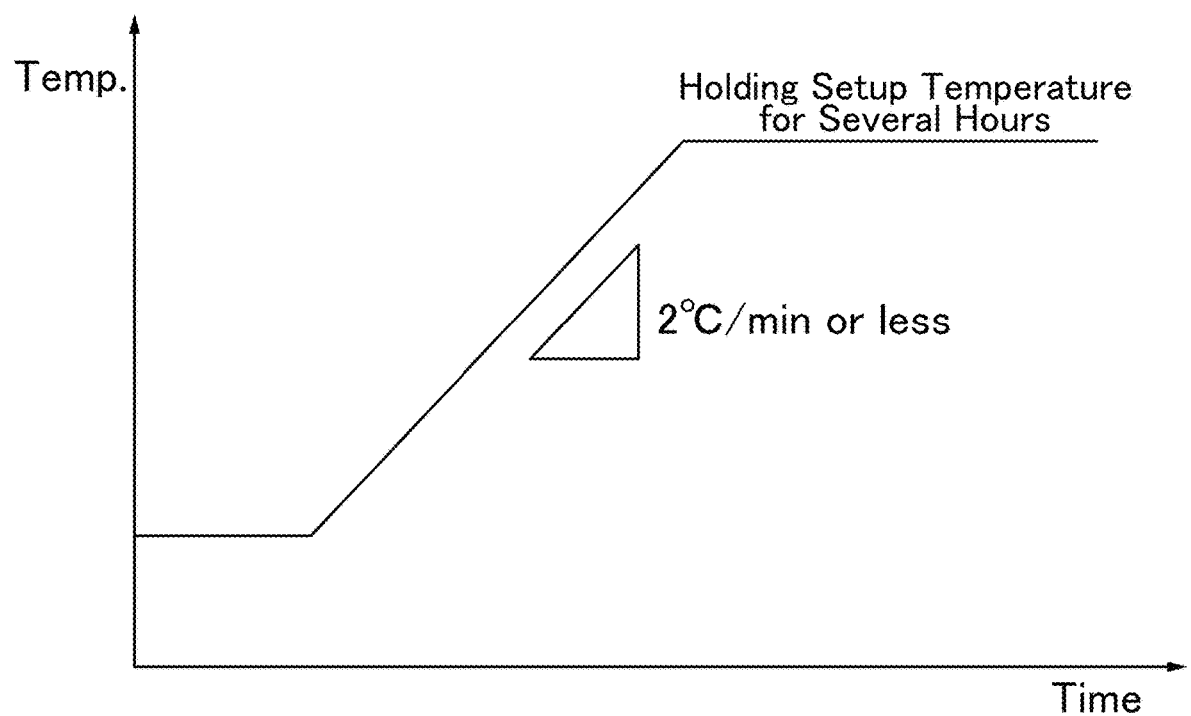
FIG. 8 is a graph showing a preferable temperature increase in calcination process.
Figure 9:
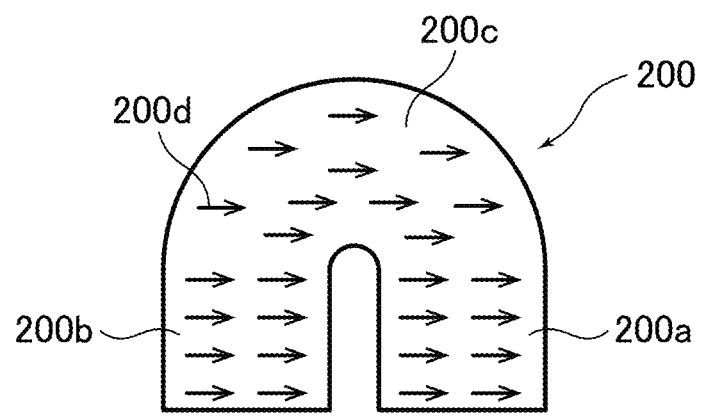
FIG. 9 shows sectional views similar to FIGS. 7(a) and (b) of another embodiment, wherein (a) shows a first shaped body, and (b) shows a second shaped body.
Figure 9:
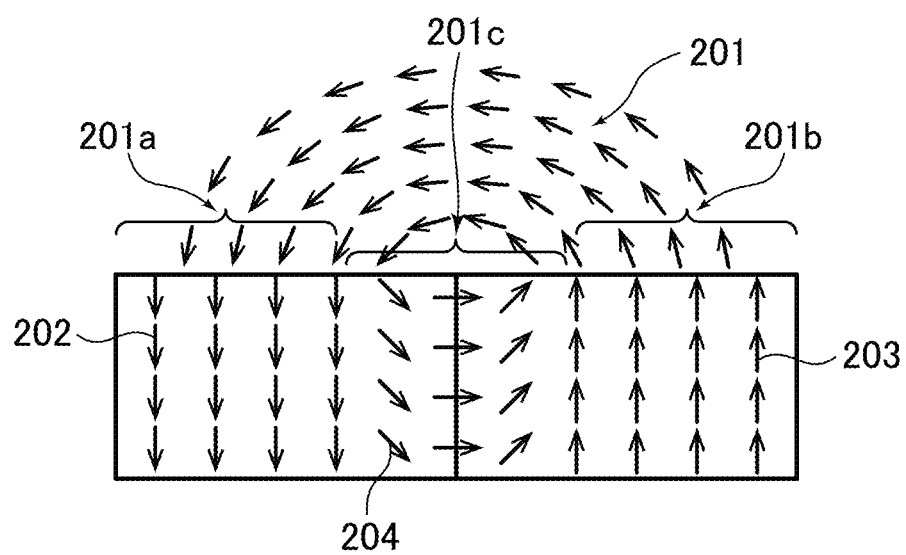

FIG. 5 shows a distribution of density of magnetic flux in the rare-earth permanent magnet 30 formed in accordance with the present embodiment. As shown in FIG. 8, the magnetic flux density D in the end regions 7 and 8 of the magnet 30 is higher than the magnetic flux density E in the central region 6. Therefore, when the magnets 30 are embedded in the rotor core 21 of the electric motor 20 and the motor 20 is operated, it is possible to have demagnetization suppressed even if a magnetic flux from the stator 23 acts on each of the end portions of the magnet 30. Therefore, there will be an adequate magnetic flux retained in the end portion of the magnet 30, so that it is possible to prevent any possible output decrease in the motor 20.

[Production Method for Rare-Earth Permanent Magnet-Forming Sintered Body]

Figure 1:
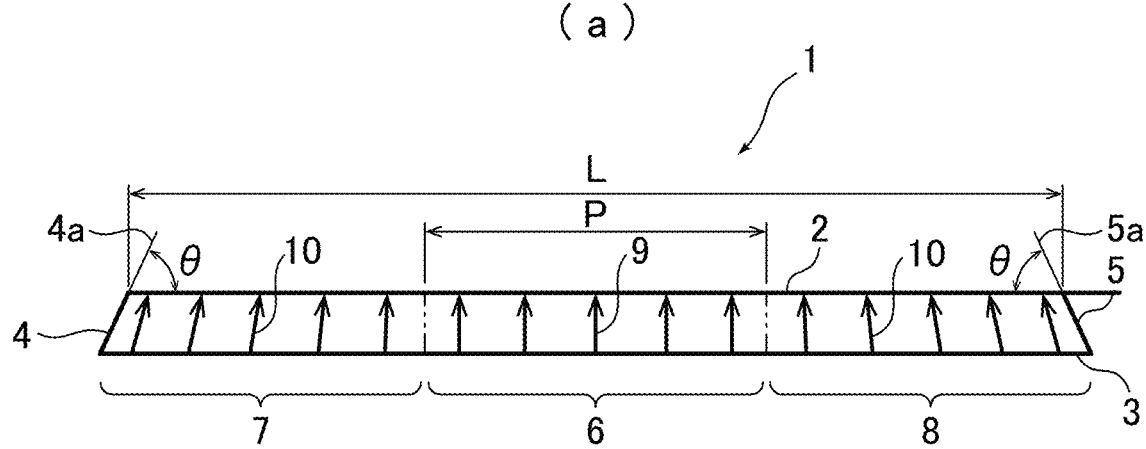
FIG. 1 shows an example of a rare-earth magnet-forming sintered body in accordance with one embodiment of the present invention, wherein (a) is a sectional view showing an overall configuration, and (b) is an enlarged view of an end portion.
Figure 1:
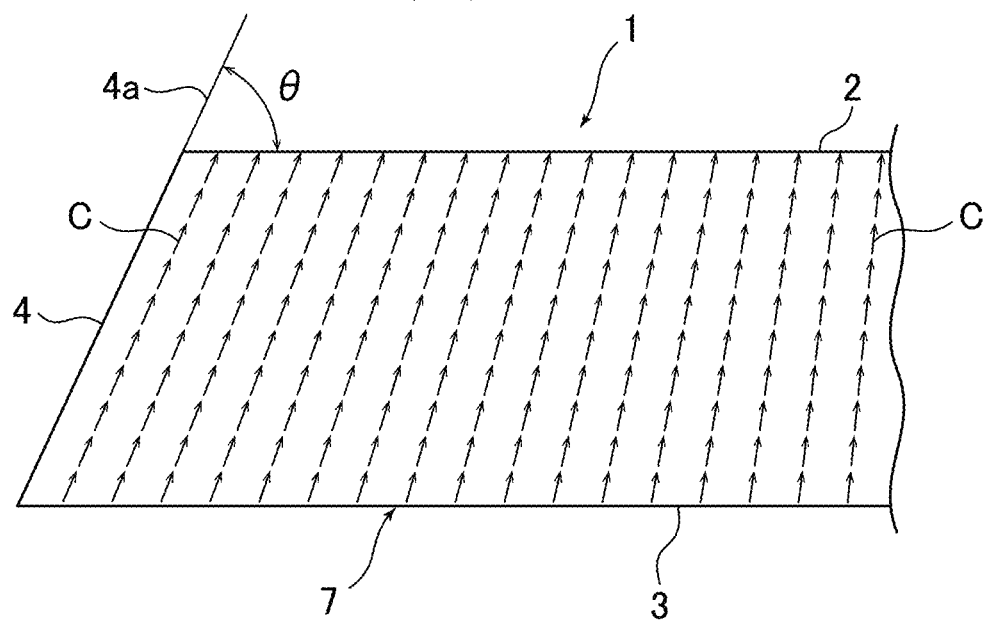
Figure 6:
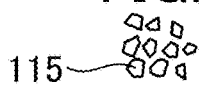
FIG. 6 is a diagrammatic illustration of production processes for producing the sintered body for forming a rare-earth permanent magnet in accordance with the embodiment shown in FIG. 1 wherein (a) to (d) depict process steps up to formation of a green sheet.
Figure 6:
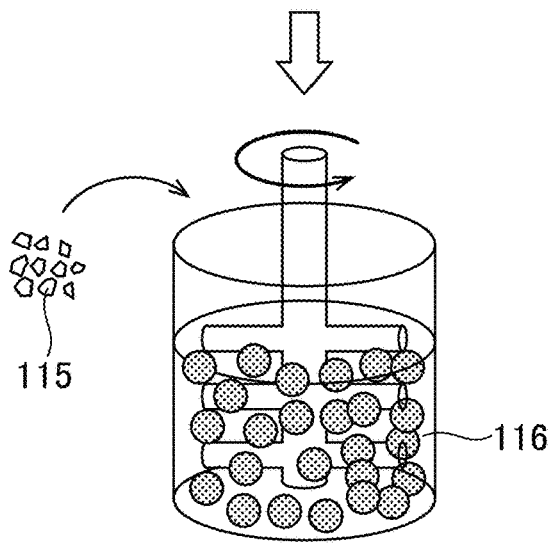
Figure 6:
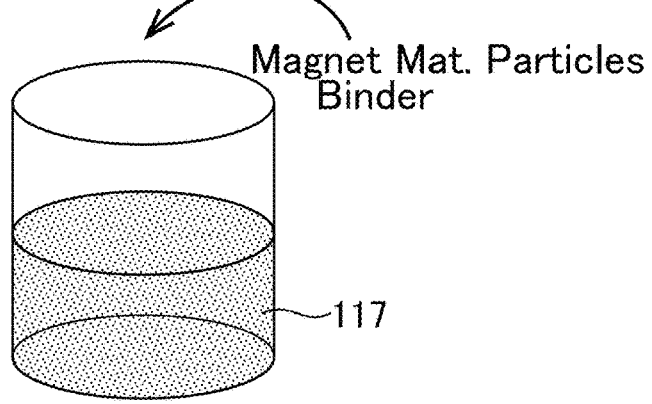
Figure 6:
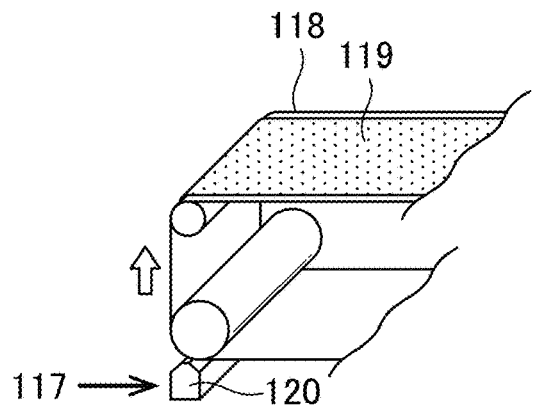

Next, with reference to FIG. 6, description will be made on a production method for the rare-earth permanent magnet-forming sintered body 1 shown in FIG. 1 according to one embodiment of the present invention. FIG. 6 is a schematic diagram depicting a production process of the permanent magnet-forming sintered body 1 according to the aforementioned embodiments.

First of all, an ingot of a magnet material comprised of an Nd—Fe—B based alloy having a given mixing ratio is produced by a known casting process. Typically, the Nd—Fe—B based alloy usable for a neodymium magnet has a composition comprising 30 wt % of Nd, 67 wt % of Fe which is preferably electrolytic iron, and 1.0 wt % of B. Subsequently, this ingot is coarsely pulverized to a size of about 200 μm, using heretofore-known means such as a stamp mill or a crusher. Alternatively, the ingot may be melted and subjected to a strip casting process to produce flakes, and then the flakes may be coarsely powdered by a hydrogen cracking process. In this way, coarsely-pulverized magnet material particles 115 are obtained (see FIG. 6(*a*)).

Subsequently, the coarsely-pulverized magnet material particles 115 are finely pulverized by a heretofore-known pulverization method such as a wet process using a bead mill 116, or a dry process using a jet mill. For example, in the fine pulverization based on a wet process using a bead mill 116, a solvent is filled in the bead mill 116 charged with beads as a pulverizing medium, and the coarsely-pulverized magnet material particles 115 is input into the solvent. Then, the coarsely-pulverized magnet material particles 115 are finely pulverized, in the solvent, to a mean particle size falling within a given range, e.g., 0.1 μm to 5.0 μm, preferably equal to or less than 3 μm to thereby disperse the resulting magnet material particles in the solvent (see FIG. 6(*b*)). Subsequently, the magnet material particles contained in the solvent after the wet pulverization are dried by drying mean such as vacuum drying, and the dried magnet material particles are taken out (not depicted). The type of solvent usable in the pulverization is not particularly limited. For example, it is possible to use organic solvent such as: alcohols such as isopropyl alcohol, ethanol and methanol; esters such as ethyl acetate; lower hydrocarbons such as pentane and hexane; aromatics such as benzene, toluene and xylene; and ketones; and mixtures thereof. The solvent is not limited to an organic solvent. Further, it is possible to use an inorganic solvent such as a liquefied inert gas such as liquefied argon, and other inorganic solvents. In any case, it is preferable to use a solvent containing no oxygen atom therein.

On the other hand, in the fine pulverization based on a dry process using a jet mill, the coarsely-pulverized magnet material particles 115 are finely pulverized by the jet mill, in (a) an atmosphere consisting inert gas such as nitrogen gas, Ar gas or He gas, wherein an oxygen content of the inert gas is not greater than 0.5%, preferably substantially 0%, or (b) an atmosphere consisting inert gas such as nitrogen gas, Ar gas or He gas, wherein an oxygen content of the inert gas is in the range of 0.001 to 0.5%, and pulverized into fine particles having an average particle size falling within a given range, such as less than 6.0 μm, or 0.7 μm to 5.0 μm. As used herein, the term "the concentration of oxygen is substantially 0%" does not limitedly mean that the concentration of oxygen is absolutely 0%, but means that oxygen may be contained in an amount to an extent that it very slightly forms an oxide layer on surfaces of the fine particles.

Subsequently, the magnet material particles finely pulverized by the bead mill 116 or other pulverizing means are formed into a desired shape. For shaping of the magnet material particles, a mixture obtained by mixing the finely-pulverized magnet material particles 115 and a binder together is preliminarily prepared. As the binder, it is preferable to use a resin material. In the case where a resin is used as the binder, it is preferable to use a polymer containing no oxygen atom in its structure and having a depolymerization property. Further, it is preferable to use a thermoplastic resin so as to enable a residue of the mixture of the magnet material particles and the binder, occurring when the mixture is formed into a desired shape such as a rectangular parallelepiped shape, as described later, to be reused, and enable magnetic field orientation to be performed under a condition that the binder is softened as a result of heating the mixture. More specifically, a polymer is suitably used which comprises one or more polymers or copolymers formed from a monomer represented by the following general formula (1):

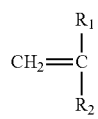

(1)

(where each of R1 and R2 denotes one of a hydrogen atom, a lower alkyl group, a phenyl group and a vinyl group.)

Examples of a polymer meeting the above conditions include: polyisobutylene (PIB) as a polymer of isobutylene; polyisoprene (isoprene rubber (IR)) as a polymer of isoprene; polypropylene, a poly(α-methylstyrene) polymerized resin as a polymer of α-methylstyrene; polyethylene; polybutadiene (butadiene rubber (BR)) as a polymer of 1,3-butadiene; polystyrene as a polymer of styrene; a styrene-isoprene-styrene block copolymer (SIS) as a copolymer of styrene and isoprene; butyl rubber (IIR) as a copolymer of isobutylene and isoprene; a styrene-isobutylene-styrene copolymer which is a copolymer of styrene and isobutylene; a styrene-butadiene-styrene block copolymer (SBS) as a copolymer of styrene and butadiene; a styrene-ethylene-butadiene-styrene copolymer (SEBS) as a copolymer of styrene, ethylene and butadiene; a styrene-ethylene-propylene-styrene copolymer (SEPS) as a copolymer of styrene, ethylene and propylene; an ethylene-propylene copolymer (EPM) as a copolymer of ethylene and propylene; EPDM obtained by copolymerizing diene monomers together with ethylene and propylene; polyethylene as a polymer of ethylene; polypropylene as a polymer of propylene; a 2-methyl-1-pentene polymerized resin as a polymer of 2-methyl-1-pentene; a 2-methyl-1-butene polymerized resin as a polymer of 2-methyl-1-butene. A resin to be used as the binder may have a composition containing a polymer or copolymer of monomers containing an oxygen atom and/or a nitrogen atom (e.g., poly(butyl methacrylate) or poly (methyl methacrylate)) in a small amount. Further, a monomer which does not meet the general formula (1) may be partially copolymerized. Even in such a situation, it is possible to achieve the object of the present invention.

As a resin to be used as the binder, it is desirable, from a viewpoint of adequately performing magnetic field orientation, to use a thermoplastic resin capable of being softened at a temperature of 250° C. or less, more specifically a thermoplastic resin having a glass-transition temperature or flow starting temperature of 250° C. or less.

In order to disperse the magnet material particles over the thermoplastic resin, it is desirable to add an orientation lubricant in an appropriate amount. As the orientation lubricant, it is desirable to add at least one selected from the group consisting of alcohol, carboxylic acid, ketone, ether, ester, amine, imine, imide, amide, cyanogen, phosphorous functional group, sulfonic acid, a compound having an unsaturated bond such as a double bond or a triple bond, and a liquid, saturated hydrocarbon compound. Two or more of them may be used in the form of a mixture. Further, in applying a magnetic field to the mixture of the magnet material particles and the binder to thereby magnetically orient the magnet material particles, as described later, the mixture is heated to allow such magnetic field orientation treatment to be performed under a condition that the binder component is softened.

By using a binder satisfying the above conditions to serve as the binder to be mixed with the magnet material particles, it is possible to reduce an amount of carbon and an amount of oxygen remaining in a rare-earth permanent magnet-forming sintered body after sintering. Specifically, the amount of carbon remaining in a rare-earth permanent magnet-forming sintered body after sintering can be reduced to 2000 ppm or less, more preferably 1000 ppm or less. Further, the amount of oxygen remaining in a rare-earth permanent magnet-forming sintered body after sintering can be reduced to 5000 ppm or less, more preferably 2000 ppm or less.

An addition amount of the binder is set to a value capable of, when shaping a slurry-form or heated and melted compound, filling gaps among the magnet material particles so as to provide improved thickness accuracy to a shaped body obtained as a result of the shaping. For example, the ratio of the binder to a total amount of the magnet material particles and the binder is controlled to be in the range of 1 wt % to 40 wt %, more preferably in the range of 2 wt % to 30 wt %, still more preferably in the range of 3 wt % to 20 wt %. most preferably in the range of 5 wt % to 15 wt %. Further, the ratio of the resin material used in the binder to a total amount of the magnet material particles and the resin material is preferably in the range of 1 wt % to 30 wt %, more preferably in the range of 2 wt % to 20 wt %, still more preferably in the range of 3 wt % to 15 wt % most preferably in the range of 3.5 wt % to 10 wt %.

In the following embodiments, the mixture is once formed into a shape other than that of an intended product, and a magnetic field is applied to the resulting shaped body to have the easy magnetization axes of the magnet material particles oriented, and thereafter, the resulting shaped body is subjected to shaping and sintering to obtain a product having a desired shape such as a trapezoidal shape as depicted, for example, in FIG. 1. Particularly, in the following embodiments, the mixture comprising the magnet material particles and the binder, i.e., a compound 117, is once formed into a sheet-like green shaped body (hereinafter referred to as "green sheet" or "shaping process sheet"), and then further formed into a shape for the orientation treatment. For forming the mixture, particularly, into a sheet shape, it is possible to adopt a forming method using, for example, a hot-melt coating process which comprises heating the compound 117 which comprises the mixture of the magnet material particles and the binder, and then coating the resulting melt onto a substrate to thereby form the melt into a sheet shape, or a slurry coating process which comprises coating a slurry containing the magnet material particles, the binder and an organic solvent, on a substrate, to thereby form the slurry into a sheet shape.

In the following description, description will be made on a production process in connection with a formation of the green sheet using, particularly, the hot-melt coating process, however, the present invention is not limited to such a specific coating process. For example, the compound 117 may be charged in a shaping die and shaped under a pressure of 0.1 to 100 MPa at a temperature between a room temperature and an elevated temperature such as 300° C. More specifically, the compound 117 heated to a softening temperature may be pressed into a molding die under an injection pressure to form a desired shape.

As already described, a binder is mixed with the magnet material particles finely pulverized using the bead mill 116 or other pulverizing means, to prepare a clayey mixture comprising the magnet material particles and the binder, i.e., a compound 117. In this process, it is possible to use, as the binder, a mixture of a resin and a dispersant as mentioned above. As one example of the binder, it is preferable to use a thermoplastic resin comprising a polymer containing no oxygen atom in its structure and having a depolymerization property. Further, as the orientation lubricant, it is preferable to add at least one selected from the group consisting of alcohol, carboxylic acid, ketone, ether, ester, amine, imine, imide, amide, cyanogen, phosphorous functional group, sulfonic acid, and a compound having an unsaturated bond such as a double bond or a triple bond.

Among the above-listed chemicals, it is preferable to use a compound having an unsaturated bond, such as a compound having a double bond or a triple bond. Particularly, a compound having a triple bond is preferable since it can be expected to provide a result of reducing crack in the sintered body.

Among the compounds having a triple bond, it is preferable to use a compound which can be easily removed in the calcining process. For the purpose, it is preferable that the compound to be used is the one which does not have a hetero atom. It is particularly preferable that the compound is of the one which is constituted only by hydrocarbon. It is further preferable that the compound having a triple bond is the one having such triple bond at the end, such that the compound is capable of acting strongly to the surface of the sintered body to provide a high effect of orientation lubrication.

As to the compound having a triple bond, for a purpose of accomplishing a high boiling point and making handling easier, it is preferable that the number of carbon as a component of the compound is 10 or more, more preferably 14 or more, further preferably 16 or more, particularly 18 or more. There is no upper limit in the number of carbons, however, the number may be 30 or less.

As to the compound having a double bond, for a purpose of providing such a compound with a property that the compound can react strongly with the surface of the magnet material particle and exhibit a high lubrication effect, it is preferable that compound has a functional group having a hetero atom, and more preferably having such functional group having a hetero atom at an end.

It is preferable in a compound having a double bond that the number of carbo is 6 or more, more preferably 10 or more, further preferably 12 or more, particularly 14 or more. There is no upper limit in the number of carbon, however, the number may be 30 or less.

It is possible to use compounds having triple bond and those having double bond may be used in combination.

As already described, an addition amount of the binder is determined to a value wherein the ratio of the binder to a total amount of the magnet material particles and the binder is in the range of 1 wt % to 40 wt %, more preferably in the range of 2 wt % to 30 wt %, still more preferably in the range of 3 wt % to 20 wt %. most preferably in the range of 5 wt % to 15 wt %. Further, the ratio of the resin material used in the binder to a total amount of the magnet material particles and the resin material is preferably in the range of 1 wt % to 30 wt %, more preferably in the range of 2 wt % to 20 wt %, still more preferably in the range of 3 wt % to 15 wt % most preferably in the range of 3.5 wt % to 10 wt %.

It should be noted herein that, an addition amount of the orientation lubricant is preferably determined depending on a particle size of the magnet material particles, and it is recommended to increase the addition amount as the particle size of the magnet material particles becomes smaller. Specifically, the addition amount may be in the range of 0.01 weight parts to 20 weight parts, preferably in the range of 0.3 weight parts to 10 weight parts, more preferably in the range of 0.5 weight parts to 5 weight parts, most preferably in the range of 0.8 weight parts to 3 weight parts, with respect to 100 weight parts of the magnet material particles. If the addition amount is excessively small, a lubrication effect becomes poor, possibly leading to deterioration in orientation property. On the other hand, if the addition amount is excessively large, the lubricant is likely to contaminate the magnet material particles. The orientation lubricant added to the magnet material particles adheres onto surfaces of the magnet material particles, and acts to facilitate dispersion of the magnet material particles to provide the clayey mixture, and to assist turning of the magnet material particles in the aftermentioned magnetic field orientation treatment. As a result, it becomes possible to facilitate orientation during application of a magnetic field so as to uniformize respective directions of easy magnetization axes of the magnet material particles, into approximately the same direction, resulting in an increase in the degree of orientation. Particularly, in the case where the binder is mixed with the magnet material particles, the binder tends to be present around the surfaces of the magnet material particles, so that a frictional force against the magnet material particles during the magnetic field orientation treatment is increased, thereby possibly leading to deterioration in orientation property of the magnet material particles. Thus, the effect arising from addition of the orientation lubricant becomes more important.

Preferably, the mixing of the magnet material particles and the binder is performed in an atmosphere of inert gas such as nitrogen gas, Ar gas or He gas. The mixing of the magnet material particles and the binder is performed for example by charging the magnet material particles and the binder into a stirring machine and stirring them using the stirring machine. In this case, with a view to enhancing kneading performance, heating-stirring (stirring under heating) may be performed. It is also desirable to perform the mixing of the magnet material particles and the binder, in an atmosphere of inert gas such as nitrogen gas, Ar gas or He gas. Particularly, in the case where the coarsely-pulverized magnet material particles are finely pulverized by a wet process, the compound material 117 may be obtained by adding the binder to a solvent used for pulverization, without extracting the magnet material particles from the solvent, and, after kneading the resulting mixture, volatilizing the solvent.

Subsequently, the compound material 117 is formed into a sheet shape to prepare the aforementioned green sheet. Specifically, in case of employing the hot-melt coating process, the compound material 117 is heated and melted to have flowability, and then coated on a support substrate 118. Subsequently, the compound material 117 is solidified by heat dissipation to form an elongated strip-shaped green sheet 119 on the support substrate 118. In this case, although a temperature during heating and melting of the compound material 117 varies depending on a type and an amount of a binder used, it is typically in the range of 50 to 300° C. In this case, it is to be understood that the temperature needs to be a value greater than the flow starting temperature of the binder used. On the other hand, in case of employing the slurry coating process, a slurry is prepared by dispersing the magnet material particles, the binder and optionally an orientation lubricant for facilitating the orientation, in a large volume of solvent, and the slurry is coated on the support substrate 118. Subsequently, the slurry is subjected to drying to volatilize the solvent therefrom to thereby form an elongated strip-shaped green sheet 119 on the support substrate 118.

As a coating system for the melted compound material 117, it is preferable to use a system having excellent layer thickness controllability, such as a slot-die system or a calender roll system. Particularly, in order to realize high thickness accuracy, it is desirable to use a die system or a comma coating system which is a system having particularly excellent layer thickness controllability, i.e., a system capable of coating a layer having a highly-accurate thickness, on a surface of a substrate. For example, in the slot-die system, the compound material 117 after being heated to have flowability is pressure-fed from a gear pump into a die, and discharged from the die to perform coating. On the other hand, in the calender roll system, the compound material 117 is fed into a nip gap between two heated rolls, in a controlled amount, and the rolls are rotated to coat the compound material 117 melted by heat of the rolls, onto the support substrate 118. As one example of the support substrate 118, it is preferable to use a silicone-treated polyester film. Further, it is preferable to use a defoaming agent or perform a vacuum heating defoaming process to sufficiently defoam a layer of the coated and developed compound material 117 so as to prevent gas bubbles from remaining in the layer. Alternatively, the melted compound material 117 may be extruded onto the support substrate 118 while being formed into a sheet shape, by an extrusion forming or injection forming, instead of being coated on the support substrate 118, to thereby form the green sheet 119 on the support substrate 118.

In the example depicted in FIG. 6, coating of the compound material 117 is performed using a slot-die 120. In a step of forming the green sheet 119 using this slot-die system, it is desirable to actually measure a sheet thickness of the coated green sheet 119, and adjust a nip gap between the slot-die 120 and the support substrate 118, by feedback control based on the actually-measured value. In this case, it is desirable to reduce a variation in an amount of the fluidic compound material 117 to be fed to the slot-die 120, as small as possible, e.g., to ±0.1% or less, and further reduce a variation in coating speed as small as possible, e.g., to ±0.1% or less. This control makes it possible to improve the thickness accuracy of the green sheet 119. As one example, with respect to a design value of 1 mm, the thickness accuracy of the green sheet 119 may be within ±10%, preferably within ±3%, more preferably within ±1%. In the calender roll system, a film thickness of the compound material 117 to be transferred to the support substrate 118 can be controlled by feedback-controlling calendering conditions based on an actually-measured value in the same manner as that described above.

Preferably, the thickness of the green sheet 119 is controlled in the range of 0.05 mm to 20 mm. If the thickness is reduced to 0.05 mm or less, it becomes necessary to laminate a plurality of layers so as to achieve a required magnet thickness, resulting in reduced productivity.

Subsequently, the green sheet 119 formed on the support substrate 118 by the hot-melt coating process is cut into a processing sheet piece 123 having a size corresponding to a desired magnet size. The processing sheet piece 123 corresponds to the first shaped body which has a configuration different from that of a desired magnet. Specifically, the processing sheet piece 123 corresponding to the first shaped body is subjected to a parallel magnetic field such that the easy magnetization axes of the magnet material particles contained in the processing sheet piece 123 are oriented in parallel direction, and thereafter, the processing sheet piece is deformed into a desired magnet shape. The processing sheet piece 123 is therefore shaped into a configuration wherein a non-parallel orientation is produced in a magnet of desired shape, when it is deformed into the desired magnet shape.

Figure 7:
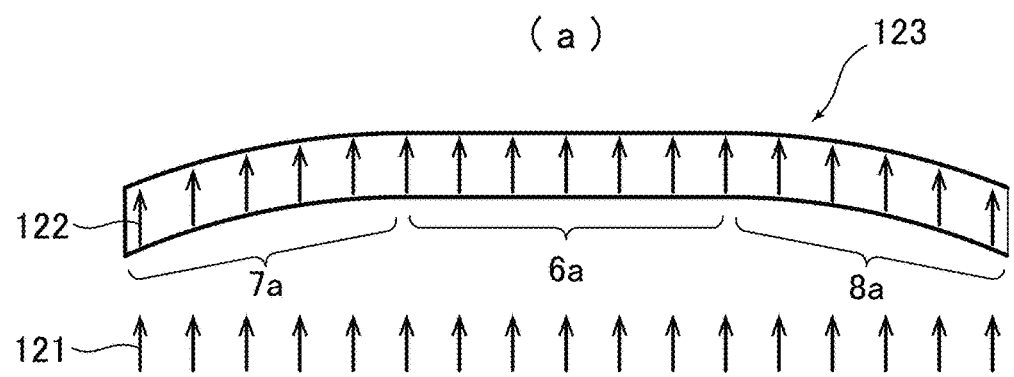
FIG. 7 shows in sectional views of a work sheet piece depicting orienting process steps for orienting the easy magnetization axes of the magnet material particles in accordance with one embodiment of the present invention, wherein (a) shows a sectional view of the work sheet piece during a magnetic field application, (b) is a sectional view of the work sheet piece which has been subjected to a deformation process after the application of the magnetic field, and (c) shows a bending process for forming the first shaped body into a second shaped body.
Figure 7:
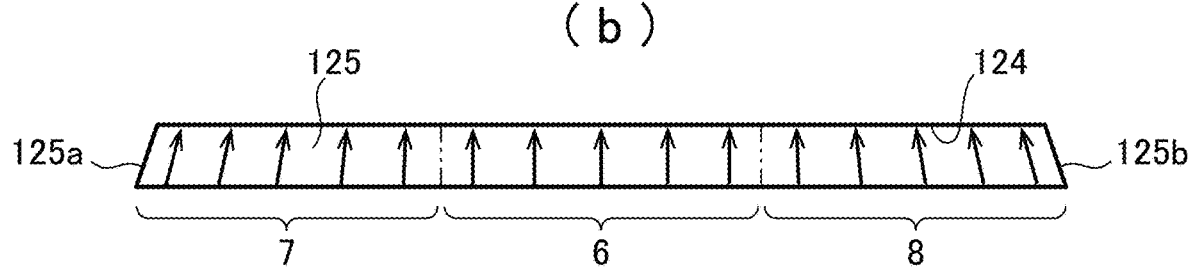
Figure 7:
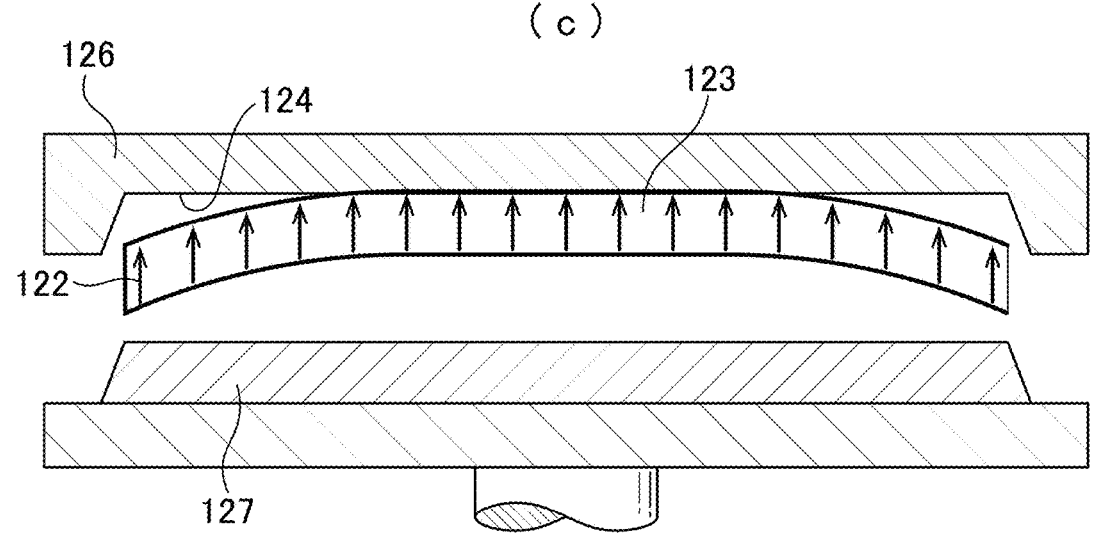

In the embodiment shown in FIGS. 1 to 5, the processing sheet piece 123 corresponding to the first shaped body is of a cross-sectional configuration including, as shown in FIG. 7(*a*), a straight region 6*a* having a widthwise dimension corresponding to that of the central region 6 in the rare-earth permanent magnet-forming sintered body 1 which is a final product having a trapezoidal shape, and arcuate regions 7*a* and 8*a* contiguous with the opposite ends of the straight region 6*a*. The processing sheet piece 123 has a lengthwise dimension perpendicular to the plane of the drawing, and all of the dimensions in the processing sheet piece 123 are determined, taking shrinkage during sintering process into consideration, such that desired magnet dimensions can be obtained after the sintering.

A parallel magnetic field 121 is applied to the processing sheet piece 123 depicted in FIG. 7(*a*), in a direction orthogonal to surfaces of the straight region 9*a*. Through this magnetic field application, easy magnetization axes of the magnet material particles contained in the processing sheet piece 123 are oriented in the direction of the magnetic field, in other words, in the direction parallel with the thickness direction, as depicted by the arrowed lines 122 in FIG. 7(*a*). More specifically, in carrying out this process, the processing sheet piece 123 is placed in a magnetic field application die (not depicted) having a cavity of a shape corresponding to that of the processing sheet piece 123, and heated to soften the binder contained in the processing sheet piece 123. Describing in more detail, the processing sheet piece 123 is heated up to a temperature wherein the binder contained in the processing sheet piece 123 is softened to a viscosity in the range of 1 to 1500 Pa·s, more preferably 1 to 500 Pa·s. This enables the magnet material particles to be turned within the binder, so that the easy magnetization axes of the magnet material particles are oriented with high accuracy in directions along the parallel magnetic field 121.

In this process, although a temperature and a time for heating the processing sheet piece 123 may vary depending on a type and an amount of the binder used, they may be in ranges, respectively, to 40 to 250° C. and 1 to 60 minutes, for example. In either case, for softening the binder contained in the processing sheet piece 123, the heating temperature needs to be of a value equal to or greater than a glass-transition temperature or flow starting temperature of the binder used. Examples of means to heat the processing sheet piece 123 include a heating system using a hot plate, and a system using, as a heat source, a heating medium such as silicone oil. The magnetic field intensity during the magnetic field application may be in the range of 5000 [Oe] to 150000 [Oe], preferably in the range of 10000 [Oe] to 120000 [Oe], especially preferably in the range of 25000 [Oe] to 70000 [Oe]. As a result, the easy magnetization axes of the magnet material particles included in the processing sheet piece 123 are oriented in parallel alignment in directions along the parallel magnetic field 121, as depicted by a reference numeral "122" in FIG. 7(*a*). This magnetic field application step may be configured such that a magnetic field is simultaneously applied to a plurality of the processing sheet pieces 123. In this case, the parallel magnetic field 121 may be simultaneously applied, using a die having a plurality of cavities or a plurality of dies arranged side-by-side. The step of applying a magnetic field to the processing sheet piece 123 may be performed in concurrence with the heating step, or during a period after completion of the heating step and before solidification of the binder of the processing sheet piece 123.

Subsequently, the processing sheet piece 123 in which the easy magnetization axes of the magnet material particles thereof are oriented in parallel alignment as indicated by the arrowed line 122 through the magnetic field application step depicted in FIG. 7(*a*) is taken out of the magnetic field application die, and transferred into a final shaping die having a trapezoidal-shaped cavity 124 having an elongated length dimension as shown in FIGS. 7(*b*) (*c*), and a pressing male die 127 having a projection corresponding in shape to the cavity 124 is used to press the processing sheet piece 123 in the cavity 124 to have the arcuate regions 7*a* and 8*a* at the opposite ends of the processing sheet piece 123 deformed to align linearly with the central straight region 9*a* to thereby form a sintering processing sheet piece 125 as shown in FIG. 7(*b*). The sintering processing sheet piece 125 corresponds to the second shaped body of the present invention.

With this shaping process, the processing sheet piece 123 is converted into an elongated trapezoidal configuration, wherein the arcuate regions 7*a* and 8*a* at the opposite ends are linearly aligned with the central straight region 6*a*, and slanted surfaces 125*a* and 125*b* are formed at the opposite ends. In the sinter processing sheet piece 125 formed in the shaping process, the easy magnetization axes of the magnet material particles contained in the central straight region 6*a* are maintained in a parallel orientation state, however, in the end regions 7*a* and 8*a*, the easy magnetization axes are directed in a concentrated manner toward portions of the upper side corresponding to the regions as shown in FIG. 7(*a*), as the result of the upwardly convex arcuate shape being deformed into a straight shape contiguous with the central straight region 6*a*.

The oriented sintering sheet piece 125 in which the easy magnetization axes of the magnet material particles thereof are oriented in the above manner is subjected to calcining process. In the calcining process, a calcining treatment is carried out in a non-oxidizing atmosphere adjusted at an atmospheric pressure, or a pressure greater or less than atmospheric pressure such as 0.1 MPa to 70 MPa, preferably 1.0 Pa or 1.0 MPa, under a decomposition temperature of the binder for a holding time of several hours to several ten hours, for example 5 hrs. In this treatment, it is recommended to use a hydrogen atmosphere or a mixed gas atmosphere of hydrogen and inert gas. In the case where the calcining treatment is performed in a hydrogen atmosphere, a supply amount of hydrogen during the calcining treatment is controlled, for example, to 5 L/min. The calcining treatment makes it possible to remove organic compounds contained in the binder by decomposing the organic compounds to monomers by a depolymerization reaction or other reactions, and releasing the monomers. That is, decarbonizing which is a treatment for reducing an amount of carbon remaining in the sinter processing sheet piece 125 is performed. Further, it is preferable to perform the calcining treatment under conditions which enable the amount of carbon remaining in the sintering sheet piece 125 to become 2000 ppm or less, preferably 1000 ppm or less. This makes it possible to densely sinter the entire sintering sheet piece 125 through subsequent sintering treatment to thereby suppress lowering of residual magnetic flux density and coercivity. In the case where a pressurization condition during the calcining treatment is set to a pressure greater than atmospheric pressure, it is desirable to set the pressure to 15 MPa or less. Further, the pressurization condition may be set to a pressure greater than atmospheric pressure, more specifically, to 0.2 MPa or more. In this case, an effect of reducing an amount of residual carbon can be particularly expected. The calcining temperature may vary depending on the type of binder, however, it is preferable that the temperature is controlled in the range of 2200° C. to 900° C., preferably in the range of 300° C. to 500° C., such as 450° C.

In the above calcining treatment, it is preferable to control a temperature rising rate to a smaller value, as compared to typical sintering treatment of a rare-earth magnet. Specifically, the temperature rising rate may be controlled to 2° C./min or less, e.g., 1.5° C./min to obtain a preferable result. Thus, the calcining treatment is performed such that a calcining temperature is increased at a given temperature rising rate of 2° C./min or less as depicted in FIG. 8, and, after reaching a predetermined setup temperature, that is, the binder decomposition temperature, held at the setup temperature for several hours to several ten hours. As above, the temperature rising speed in the calcining treatment is controlled to a relatively small value, so that carbon in the entire sintering sheet piece 125 is removed in a step-by-step manner without being rapidly removed. This makes it possible to reduce an amount of residual carbon to a sufficient level to thereby increase the density of a permanent magnet-forming sintered body after sintering. That is, by reducing the amount of residual carbon, it is possible to reduce voids in a permanent magnet. When the temperature rising rate is set to about 2° C./min as mentioned above, the density of a permanent magnet-forming sintered body after sintering can be increased to 98% or more, for example, 7.40 g/cm$^3$ or more. As a result, high magnet properties can expected in a magnet after magnetization.

Further, a de-oiling process may be conducted before the calcining treatment for dissipating oil contents such as the orientation lubricant, plasticizer, etc. The temperature for the de-oiling process may vary depending on the type of oil contained, the temperature may be in the range of 60° C. to 120° C., preferably in the range of 80° C. to 100° C. In the de-oiling process, a preferably result can be obtained by controlling the temperature raising rate to 5° C./min or less, for example, 0.7° C./min. A further preferable result can be obtained by conducting the de-oiling process in an atmosphere of reduced pressure, preferably in the range of 0.01 Pa to 20 Pa, more preferably in the range of 0.1 Pa to 10 Pa.

Subsequently, a sintering treatment is performed for sintering the sintering processing sheet piece 125 calcined by the calcining treatment. For the sintering treatment, it may be possible to adopt a non-pressure sintering process under an atmosphere of a suction pressure, however, in the preferred embodiment described herein, adoption is made of a uniaxial pressing-sintering method wherein the sintering processing sheet piece 125 is sintered while it is pressed in a uniaxial direction perpendicular to the plane of the sheet of FIG. 7. In this method, the sintering processing sheet piece 125 is loaded in a sintering die (not depicted) having a cavity of the same shape as that shown by "124" in FIG. 7(b). Then, after closing the die, the sinter processing sheet piece is sintered while being pressed in the direction perpendicular to the sheet of FIG. 7, that is, the lengthwise direction of the sinter processing sheet piece 125. Specifically, a uniaxial pressing sintering process is adopted, by having the sintering processing sheet piece 125 sintered while being pressed in a direction which is perpendicular to the rotation axis of the rotor core 21 when the rare-earth permanent magnet produced from the sinter processing sheet piece 125 is inserted into the magnet receiving slot 24. As this pressing-sintering technique, it is possible to employ any heretofore-known techniques such as hot press sintering, hot isostatic press (HIP) sintering, ultrahigh pressure synthesis sintering, gas pressure sintering, and spark plasma sintering (SPS). In particular, it is preferable to employ a hot press sintering in which a pressure can be applied in a uniaxial direction. In the case where the sintering is conducted under a hot press sintering method, it is preferred that the pressure is adjusted in the range of for example 0.01 MPa to 100 MPa, preferably 0.01 MPa to 30 MPa, more preferably 0.01 MPa to 15 MPa, further preferably 1 MPa to 15 MPa, particularly preferably 5 MPa to 15 MPa, the temperature being raised under an atmosphere of a reduced pressure such as several Pa or lower to a temperature between 900° C. to 1000° C., for example to 940° C. at a temperature raising rate of 3° C./min. to 30° C./min. such as 10° C./min., and maintain at the temperature until the rate of change of the dimension in the direction of pressing in 10 seconds becomes 0. The time for maintaining the temperature is generally 5 minutes. Thereafter, the sintered sheet piece is cooled and heated again to a temperature in the range of 300° C. to 1000° C. and maintained under the temperature for 2 hours. With such a sintering process, it is possible to produce a sintered body 1 for forming a rare-earth permanent magnet in accordance with one embodiment of the present invention As described, with the uniaxial sintering process wherein the sinter processing sheet piece 125 is sintered while being pressed in the lengthwise direction, it is possible to avoid any possible risk of the orientation of the easy magnetization axes produced in the magnet material particles being changed during the sintering process. During the sintering process, substantially all of the resin material in the sinter processing sheet piece is dissipated so that the residual amount of resin material is very small, if any.

Through the sintering treatment, the magnet material particles are sintered together to form a sintered body, in a state wherein the resin material has been dissipated. Typically, through the sintering treatment, a rare-earth-rich phase having a high rare-earth concentration is melted and tends to fill spaces which had existed among the magnet material particles to thereby form a sintered body of a fine compositions comprising a primary phase having an $R_2Fe_{14}B$ (R represents rare-earth materials including yttrium), and a rare-earth-rich phase.

In the case of the illustrated embodiment, the sintered body 1 for forming a rare-earth permanent magnet is inserted into the magnet receiving slot 24 of the rotor core 21 shown in FIG. 2, under a non-magnetized state. Thereafter, the sintered body 1 for forming a rare-earth permanent magnet inserted into the slot 24 is magnetized along the easy magnetization axes, i.e., the crystal C-axes of the magnet material particles contained in the sintered body 1. Specifically, a plurality of sintered bodies 1 inserted into a plurality of slots 24 are subjected to a magnetization treatment so that N poles and S poles are alternately produced along the periphery of the rotor core 21. Thus, it is possible to produce a rare-earth permanent magnet from the sintered body 1. In magnetizing the sintered body 1 for forming a rare-earth permanent magnet, any of known devices such as magnetizing coils, magnetizing yokes, capacitor type magnetizing source may be used. Further, the sintered body may be magnetized prior to insertion into the slot 24, and the magnetized body may be inserted into the slot 24.

According to the method for producing a sintered body for forming a rare-earth permanent magnet described above, by shaping a mixture of magnet materials and a binder, it becomes possible to accomplish orientations of the easy magnetization axes of the magnet material particles wherein the easy magnetization are appropriately converged toward surfaces of end regions where measures for suppressing demagnetization are desired. Thus, it is possible to have a magnetic flux appropriately converged after magnetization of the sintered body, with the results that a demagnetization property can be ensured and that deviation of magnetic flux density can be suppressed. Further, a mixture of the magnet material particles and a binder is used in the shaping process, there is no risk of the magnet material particles being turned after the orientation process, so that it is possible to further enhance the orientation accuracy as compared with a conventional particle press-sintering process. According to the method wherein a compound comprising a mixture of magnet material particles and a binder is subjected to a magnetic field application for the orientation, it is possible to increase as desired a number of turns of wires for passing current for producing a magnetic field, to provide a substantial value of magnetic field intensity in carrying out the orientation under a magnetic field, and can apply a static magnetic field for a long time, so that it is possible to realize a highly accurate orientation with less deviations. It should further be noted that by changing the direction of orientation as described, it becomes possible to ensure a highly accurate orientation with less deviations.

The fact that highly accurate orientations with less deviations can be realized means that variations in shrinkage during the sintering process can also be minimized. As the result, it is possible to reduce the necessity for outer shape trimming after a sintering process, so that it can be expected that a highly efficient production can be realized. Further, in the magnetic field orientation process, a magnetic field is applied to a compound made of a mixture of the magnet material particles and a binder, and in the case of the embodiment shown and described with reference FIGS. 4 to 9, a shaped body to which a magnetic field is applied is thereafter deformed into a shape of final product. Therefore, the directions of orientations can be modified by deforming the compound to which a magnetic field has been applied, to thereby concentrate the orientation directions of the easy magnetization axes to a region where measures for preventing demagnetization. As a result, it is possible to accomplish a highly accurate orientation with less deviation. The compound is shaped into a processing sheet piece to which a magnetic flux is applied and a deformation process is conducted to provide a sintering processing sheet piece, so that it is possible to modify the direction of orientation concurrently with the deformation process, resulting in an improvement of productivity. Further, as already stated, in a rotary electric machine which have permanent magnets produced by magnetizing the sintered bodies, even if an external magnetic field is applied to end portions of the magnets produced by magnetizing the sintered bodies in a direction in which a demagnetization effect may be produced, it is possible to prevent any reduction in the output torque or power generation. In the aforementioned embodiment, the permanent magnet-forming sintered body is in a configuration having a trapezoidal cross-section, however, it is possible to adopt other shapes such as an arcuate shape, or a semi-circular shape, depending on the application. Further, it is possible that the shape of the realized magnetic flux distribution may be appropriately changed depending on the shape or application of the permanent magnet.

In deforming the compound which has been subjected to a magnetic flux application, the deforming process may be conducted in such a manner that the maximum elongation caused by the deformation becomes 0.1% or more, preferably 1% or more, more preferably 3% or more, further preferably 5% or more, particularly preferably 10% or more. There is no upper limit in the maximum elongation, however, the deformation may be conducted such that the maximum elongation is 50% or less, 40% or less, or 30% or less. the aforementioned maximum elongation means a maximum elongation among values of elongations calculated by the formula $$[(W2-W1)/W1] \times 100(\%)$$

where: W1 is a length of a side of a section before deformation, and W2 is a length after deformation of a corresponding side.

FIGS. 9(a) (b) are illustrations similar to FIGS. 7(a) (b) but showing another embodiment of the method in accordance with the present invention. As shown in FIG. 9(a), the first shaped body 200 formed from the green sheet 119 is of an inverted "U" shaped configuration including a pair of legs 200a and 200b, and a semi-circular portion 200c between the legs 200a and 200b, and the easy magnetization axes of the magnet material particles in the first shaped body 200 are oriented in parallel each other, through application of external parallel magnetic flux, as shown by an arrow 200d in FIG. 9(a) from left to right in the plane of the drawing. The first shaped body of an inverted U-shape is deformed under a predefined temperature condition into a straight configuration as shown in FIG. 9(b) to form a second shaped body 201. It is preferable that the deformation process from the first shaped body 200 to the second shaped body 201 is carried out in a several steps, such that in each step, a small amount of deformation takes place for preventing an excessive deformation at a time. For the purpose, it is preferable to provide a plurality of shaping dies each having a cavity corresponding to a deformation in each step, and carry out the forming process suitable for each step. It is to be noted that in the second shaped body 201 shown in FIG. 9(b), the easy magnetization axes of the magnet material particles in the second shaped body 201 have a parallel orientation in one end region 201a directed from upside to downside in the plane of the drawing as shown by an arrow 202 in FIG. 9(b), and a parallel orientation in the other end region 201b directed from downside to upside in the plane of the drawing as shown by an arrow 203 in FIG. 9(b). In a central region 201c between the end regions 201a and 201b, the orientation is in the form of an upwardly concave arc as shown by an arrow 204 in the drawing. In a rare-earth permanent magnet obtained by magnetizing the rare-earth permanent magnet-forming sintered body which has been prepared by sintering the second shaped body 201, there is produced a magnetic flux flow wherein magnetic flux exits from the upper surface of the one end region 201b, passes through an arcuate path and enters to the magnet at the upper surface of the other end region 201a. Therefore, in this magnet it is possible to produce a magnetic flux flow augmented at one surface of the magnet. Such magnet is appropriate for use in a linear motor.

Figure 10:
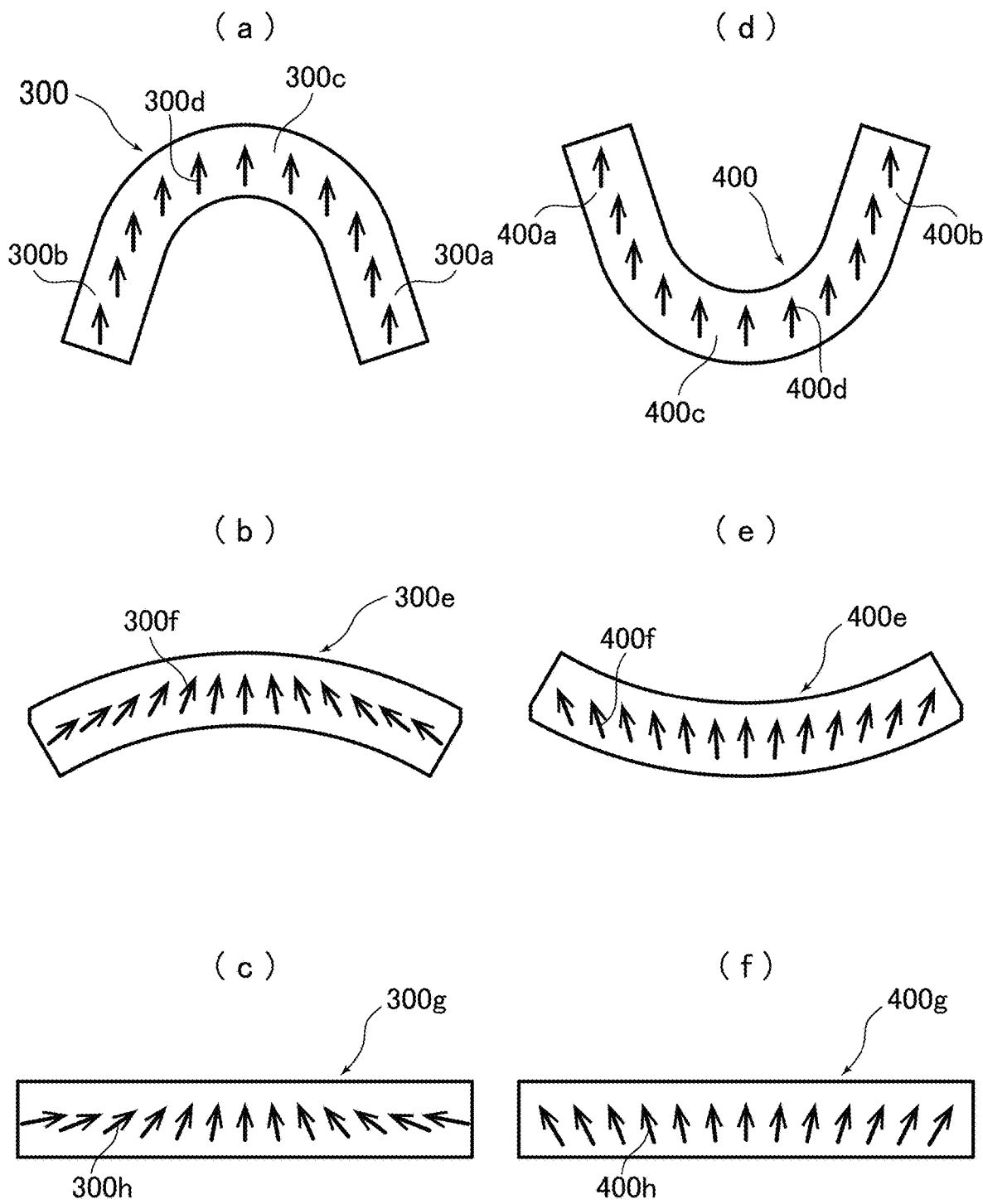
FIG. 10 are diagrammatical illustrations similar to FIGS. 9(a) and (b) of different embodiments, wherein (a) shows a first shaped body in accordance with one aspect, (b) shows a second shaped body of the one aspect, (c) shows a second shaped body in accordance with another aspect, (d) shows a first shaped body in accordance with a further aspect, (e) shows a second shaped body of the further aspect, and (f) shows a second shaped body in accordance with still further aspect.

FIG. 10(a) shows a further embodiment of the present invention, including a first shaped body 300 has a configuration wherein, as compared with the inverted U-shape in the first shaped body 200 shown in FIG. 9(a), the space between a pair of legs 300a and 300b is widened at an end opposite to the semicircular portion 300c. The parallel magnetic flux is then directed from bottom to an upward direction. Thus, the easy magnetization axes of the magnet material particles contained in the first shaped body 300 are oriented in parallel upwardly from bottom as shown by an arrow 300d in FIG. 10(a). The first shaped body 300 is deformed into an arcuate shape shown in FIG. 10(b) to form a second shaped body 300e. Easy magnetization axes 300f of the magnet material particles are oriented as shown in FIG. 10(b) in a manner that the orientation angle is gradually increased toward the widthwise central region so that the orientation direction is concentrated toward the central portion. Thus, it is possible to produce a sintered body having orientations of the easy magnetization axes suitable for an arcuate magnet segment having polar anisotropy orientation. FIG. 10(c) shows a modification of the shaped body shown in FIG. 10(b), wherein a second shaped body 300g is formed from the first shaped body 300 by deforming it into an elongated parallelepiped shape. The orientations of the easy magnetization axes 300h of the modified second shaped body 300g are similar to those shown in FIG. 10(b). A magnet of polar anisotropy obtainable by magnetizing the sintered body shown in FIG. 10(b) which is produced by sintering the arcuate segment having a polar anisotropy orientations can be used for producing a Surface Permanent Magnet type (SPM) motor by arranging a plurality of such magnets on a peripheral surface of a rotor in a circumferential direction.

FIG. 10(d) shows a first shaped body 400 which is obtained by turning upside down the first shaped body 300 shown in FIG. 10(a) so as to have an open legged U-shape including a pair of legs 400a and 400b, and a semi-circular portion 400c between the legs 400a and 400b. The external parallel magnetic field is directed upwards from bottom. As a result, the easy magnetization axes of the magnet material particles contained in the first shaped body 400 have parallel orientations oriented from bottom upwards as shown by an arrow 400d in the drawing. In FIG. 10(e), there is shown a second shaped body 400e obtained by deforming the first shaped body 400 into a shape of an arc having a radius of curvature larger than that of the semi-circular portion 400c. The easy magnetization axes 400f of the magnet material particles contained in the second shaped body 400e have orientations spread from the widthwise central portion toward the end portions as shown in FIG. 10(e). FIG. 10(f) shows a second shaped body 400g which is a modification of the second shaped body shown in FIG. 10(e) and is deformed into an elongated parallelepiped configuration. The easy magnetization axes in the modified second shaped body 400g have orientations similar to those shown in FIG. 10(e).

Figure 11:
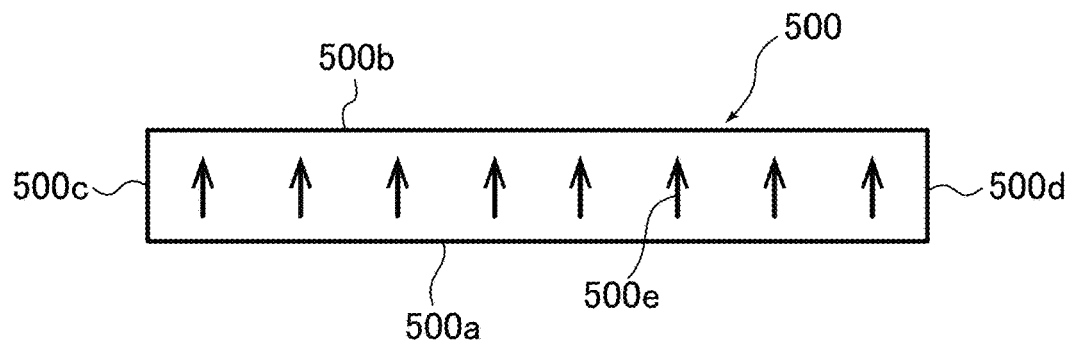
FIG. 11 shows an embodiment of the present invention for producing an annular magnet having a radial orientation, wherein (a) is a side view showing a first shaped body, (b) is a perspective view showing a second shaped body, and (c) is a perspective view showing a second shaped body which has been formed into an annular shape in a way different from that shown in (b) for producing an annular magnet having an axial orientation.
Figure 11:
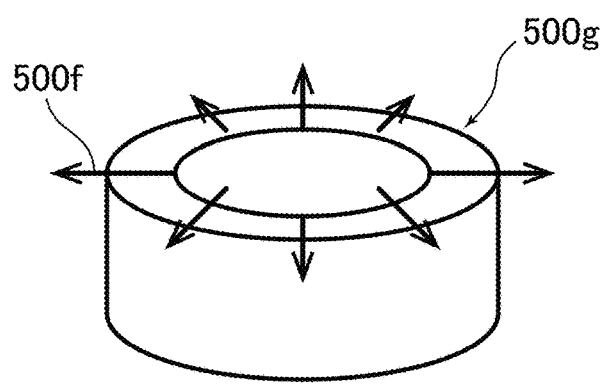
Figure 11:
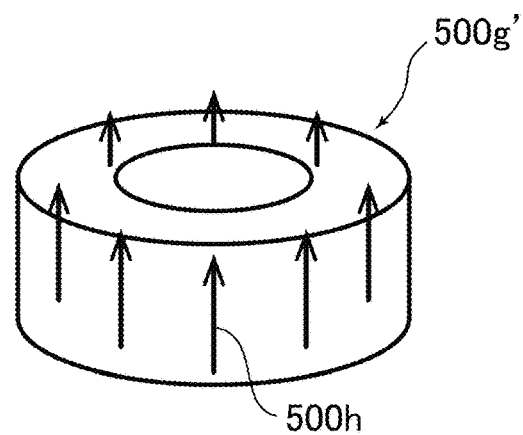

FIGS. 11(a) (b) are a side view and a perspective view, respectively, illustrating a method for producing a rear-earth magnet-forming sintered body of an annular configuration having radial orientation wherein easy magnetization axes of magnet material particles are oriented in radial directions. In FIG. 11(a), there is shown a first shaped body 500 which is substantially of a parallelepiped shape having a substantially rectangular cross-sectional configuration and a length in a direction perpendicular to the plane of the drawing, the first shaped body further having a lower surface 500a corresponding to the first surface, an upper surface 500b parallel to the lower surface 500a and corresponding to the second surface, and end surfaces 500c and 500d at the opposite end portions. An external parallel magnetic field is applied to the first shaped body 500 from bottom toward upward direction, whereby the easy magnetization axes of magnet material particles contained in the first shaped body 500 are oriented in parallel with each other in a direction from the lower surface 500a toward the upper surface 500b. The first shaped body 500 is bent into an annular shape with the upper surface 500b positioned radially outside and the lower surface 500a radially inside. In the bending process, the opposite ends surfaces 500c and 500d are brought into an abutting contact to form the annular shape. For the purpose, the opposite end surfaces 500c and 500d are cut to form slanted surfaces. The end surfaces 500c and 500d in abutting contact are then joined together through a melt joining technique. As the results of the bending and joining processes, a second shaped body 500g of an annular shape is produced as shown in FIG. 11(b). In the second shaped body 500g shown in FIG. 11(b) the easy magnetization axes 500f of the magnet material particles are directed in radial directions to provide a radial orientation. Referring now to FIG. 11(c), the first shaped body 500 shown in FIG. 11(a) is bent into an annular shape in a way that the portion extending perpendicularly to the plane of the drawing positioned radially inwards. In this case, the opposite end surfaces 500c and 500d are appropriately cut to form slanted surfaces so that they can be brought into an abutting contact to form the annular shape. The abutted end surfaces 500c and 500d are then joined by a melt joining technique. As the results of the bending and joining processes, an annular second shaped body 500g' is formed as shown in FIG. 11(c). In the second shaped body 500g' shown in FIG. 11(c), the easy magnetization axes 500h of the magnet material particles are directed in an axial direction to provide an axial orientation.

Figure 12:
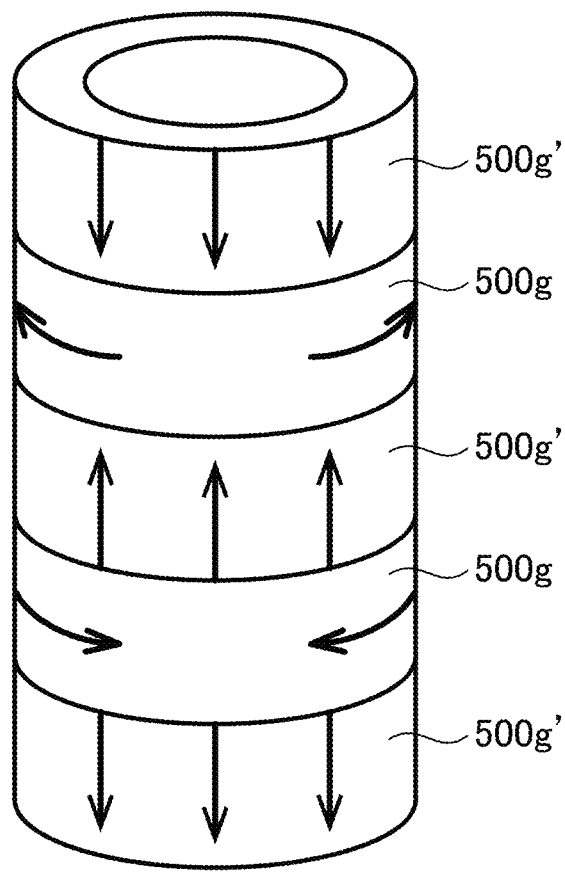
FIG. 12 shows an example wherein a magnet having a Halbach arrangement is produced using the annular magnets made in accordance with the embodiments shown in FIG. 11.

FIG. 12 depicts a magnet having a Halbach arrangement from rare-earth magnet-forming sintered bodies respectively obtained by sintering the second shaped bodies 500g shown in FIG. 11(b) each having an annular shape with the radial orientation of the easy magnetization axes and the second shaped bodies 500g' shown in FIG. 11(c) each having an annular shape with the axial orientation of the easy magnetization axes. The sintered bodies are magnetized to produce respectively annular rare-earth permanent magnets having radial orientation and those having axial orientation. The annular magnets having radial orientation and those having axial orientation are arranged alternately as shown in FIG. 12. Annular magnets of Halbach arrangement are believed to have a prospective future particularly in applications for synchronized linear motor. For example, the U.S. Pat. No. 5,705,902 (Patent Document 10) discloses examples wherein magnets of this type are used in a series DC motor-generator, and JP 2013-215021A (Patent Document 11) discloses another application. However, in the past, it has not been easy to produce a radially oriented or axially oriented annular magnet stably with low cost. According to the method described above, it is possible to produce annular magnets respectively having radial and axial orientations of magnetization while providing high magnetic properties, in an easy manner.

Figure 13:
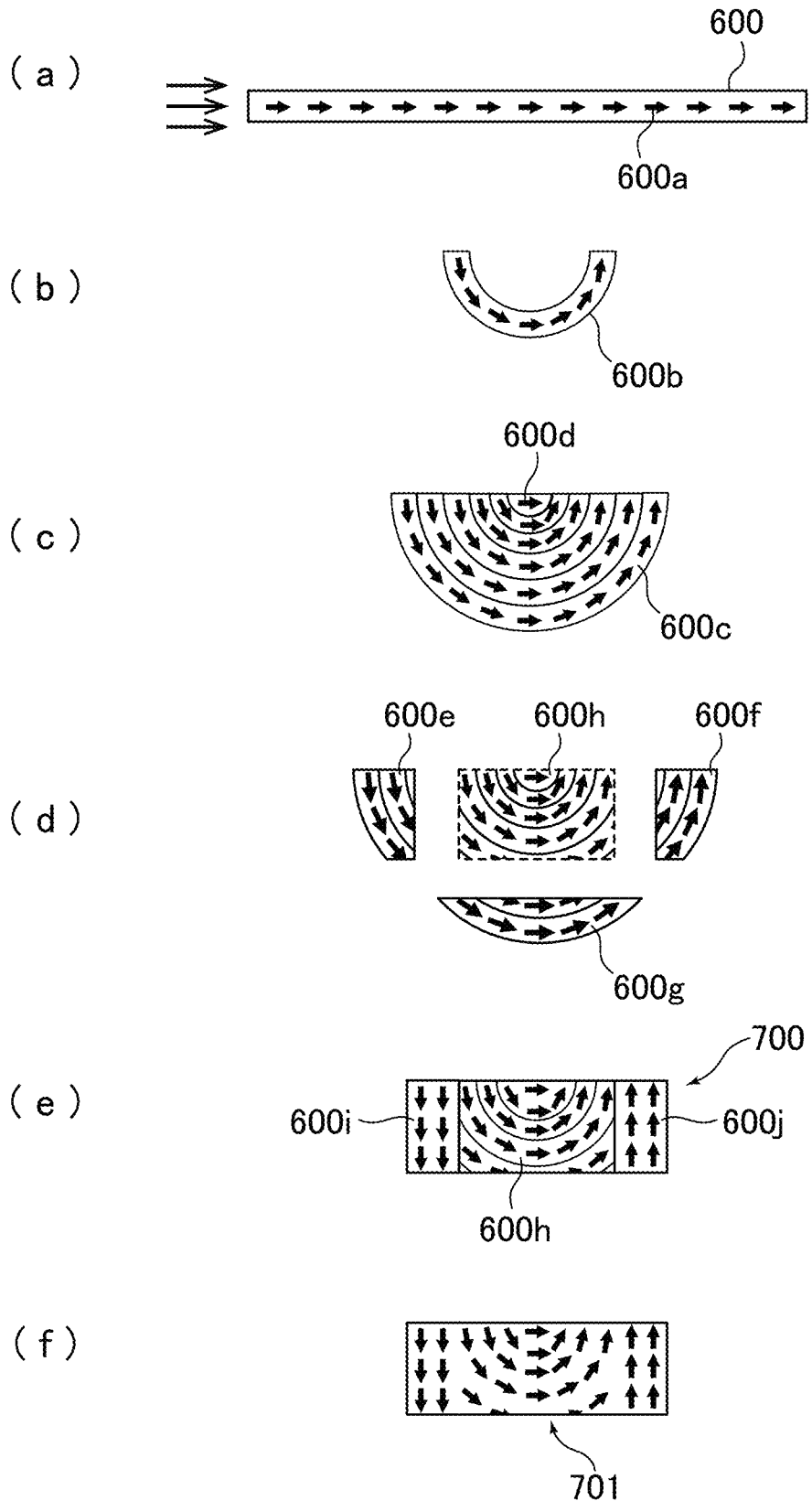
FIG. 13 shows a further embodiment of the present invention, wherein (a), (b), (c), (d), (e) and (f) illustrate sequential steps.

In FIG. 13, there is shown another embodiment for producing a rare-earth magnet-forming sintered body having orientations of easy magnetization axes similar to those shown in FIG. 9(b). In this embodiment, an external magnetic field is applied to a green sheet 600 in a direction parallel to the widthwise direction of the green sheet 600 as shown in FIG. 13(a). With this application of the magnetic field, the easy magnetization axes of the magnet material particles contained in the green sheet 600 are oriented in the widthwise direction of the green sheet as shown by arrows 600a in FIG. 13(a). Then, the green sheet 600 having the orientations described above is introduced into a die having a cavity of a semi-circular arc-shaped configuration. The green sheet 600 is then heated up to a softening temperature of resin material in the green sheet 600 and deformed into a semi-circular arc shape to form an arcuate-shaped member 600b shown in FIG. 13(b). Plurality of arcuate-shaped members of radius of curvatures which are different from each other by a thickness of the arcuate-shaped members are provided. These arcuate-shaped members of different radius of curvatures are stacked together, and joined together by partially melting them to form a semi-circular intermediate member 600c as shown in FIG. 13(c). In this instance, the semi-circular member 600d positioned in the center of the arc is produced by directly cutting from the green sheet 600.

The semi-circular intermediate member 600c is cut as shown in FIG. 13(d) to remove widthwise end portions 600e and 600f, and lower portion 600g, so that a central portion having a predefined thickness dimension and a predefined widthwise dimension is left as a sintering member piece 600h. A sintering end piece 600i having an upwardly directed orientations of the easy magnetization axes and a sintering end piece 600j having a downwardly directed orientations of the easy magnetization axes are joined by melt joining to the opposite ends of the sintering member piece 600h to provide a sintering magnet member 700. The sintering magnet member 700 is then introduced into a sintering die having a cavity of a corresponding shape, and subjected to a sintering treatment under predefined conditions to provide a rare-earth magnet-forming sintered body 701 shown in FIG. 13(f). In carrying out the sintering treatment, a pressing force may or may not be applied in the direction perpendicular to the plane of the drawing. The rare-earth magnet-forming sintered body 701 has orientations of the easy magnetization axes wherein the orientations are of an upwardly concave arcuate pattern in the central portion, and upwardly and downwardly directed orientations respectively at the opposite end portions, as shown in FIG. 13(f). A rare-earth magnet which can be obtained by magnetizing the sintered body produced a magnetic flux similar to that shown in FIG. 9(b).

EXAMPLES

Hereinafter, examples of the present invention will be described. In the inventive examples, the comparative examples and the reference examples, materials shown in Table 1 were used.

TABLE 1

| Material | Manufacturer | Product Name | Tg (° C.) | Molecular Weight |
|---|---|---|---|---|
| 1-Octadecyne | Wako Pharmaceutical | — | 30 | |
| 1-Octadecene | Wako Pharmaceutical | — | 15 | |
| Oleyl Alcohol | Shin-Nippon Rika | Rika-Cole 90B | 3 | |
| PIB | BASF | Oppanol B100 | −68 | $1.1 \times 10^6$ |
| PIB | BASF | Oppanol B150 | −68 | $2.6 \times 10^6$ |

Example 1

A first shaped body and a second shaped body respectively having configurations shown in FIGS. 7(a) and (b) were produced according to the below described processes. The first shaped body was 1.60 mm in thickness, 25 mm in overall width, 8 mm in width of each of the end regions 7a and 8a. In the end regions 7a and 8a, the first surface was of a radius of curvature of 18.80 mm and that of the second surface was 21.5 mm, with the center of curvature located on an imaginary line drawn from an end of the central region 6a perpendicularly to the surface of the central region 6a.

<Coarse Pulverization>

An alloy of a composition A (Nd; 23 wt. %; Pr; 6.75 wt. %; B; 1.00 wt. %; Ga; 0.1 wt. %; Nb; 0.2 wt. %; Co; 2.0 wt. %; Cu; 0.1 wt. %; Fe; balance; other unavoidable impurities) was prepared by a strip casting method and had hydrogen absorbed in a room temperature. The hydrogen absorbed alloy composition was held under an atmosphere of 0.85 MPa for one day. Then, the alloy was subjected to a hydrogen pulverization treatment by holding it under an atmosphere of 0.2 MPa while cooling it.

<Fine Pulverization>

100 g of the coarse pulverized particles of the alloy was mixed with 1.5 kg of Zr beads of 2 mm in diameter and charged into a ball mill (Atlita: available from Nippon Cokes Industries) having a tank capacity of 8 L and pulverized at a rotational speed of 500 rpm for 2 hours. As a pulverizing additive, 100 weight parts of benzene was added, and Ar was used as a solvent.

<Kneading>

6.7 weight parts of 1-octadecyne and 50 weight parts of an 8 weight % toluene solution of polyisobutylene (PIB) (Opanol B150; from BASF) were added to 100 weight parts of the pulverized alloy particles and agitated in a mixer (TX-0.5; by Inoue Seisakusho) under an elevated temperature of 70° C. and a reduced pressure. Thereafter, toluene was evaporated and kneading was conducted under a suction pressure for 2 hours to produce a clayey compound material.

<Formation of First Shaped Body>

The compound material produced in the kneading process was introduced into a die of corrosion resistant steel (SUS) having a cavity similar to that shown in FIG. 7(a) to produce a first shaped body.

<Orientation under Magnetic Field>

The first shaped body was then subjected to an orientation process by applying an external parallel magnetic field in the direction shown in FIG. 7(a) to the corrosion resistant steel (SUS) die containing the first shaped body using a super conductive solenoid coil (Trade Name: JMTD-12T100 manufactured by JASTEC Co.). The orientation process was carried out under a temperature of 80° C. for 10 minutes while applying an external parallel magnetic field of an intensity of 7 T. Then, a de-magnetizing treatment was carried out by applying to the shaped body a reverse magnetic field. The application of the reverse magnetic field was carried out by changing the intensity from −0.2 T to +0.18 T and then to −0.16 T and the magnetic field was gradually decreased to an intensity of 0.

<Deforming Process>

Subsequent to the orientation process, the shaped body of the compound material was taken out of the corrosion resistant steel die and brought into an female die having a cavity which has portions corresponding the second surfaces of the end regions 7a and 8a each having a radius of curvature of 50.00 mm and pressed by a male die having die surfaces corresponding to the first surfaces of the end regions 7a and 8a each having a radius of curvature of 50.00 mm to thereby deform the first shaped die into an intermediate shaped body. The intermediate shaped body was then transferred into a female die having a cavity corresponding to the second surface of the second shaped body, and pressed by a male die having a die surface corresponding to the first surface of the second shaped body to have the intermediate shaped body deformed so as to form a second shaped body. The deformation processes to deform into the intermediate shaped body and into the second shaped body were carried out under a temperature condition of 60 vsheet in the intermediate shaping die under a temperature of 60° C. Further, the formed shaping process sheet was taken out of the intermediate shaping die and brought into a final shaping die of corrosion resistant steel (SUS) having a cavity shape shown in FIGS. 10(b) and (c). A final shaping was conducted by pressing the shaping process sheet in the die under a temperature of 60° C.

After the deformation process, the shaped body was taken out of the corrosion resistant steel die and transferred into a graphite die having a cavity identical to that of the shaped body. The cavity of the graphite die had a lengthwise dimension which is longer than the length of the shaped body by about 20 mm, and the shaped body was inserted into the die so that it is located at the center position of the cavity. The graphite die was applied at the wall surface with BN (boron nitride) for a remover.

<De-Oiling>

A de-oiling process was conducted to the shaped body in the graphite die under an atmosphere of a reduced pressure. A rotary pump was used as an evacuating pump, and the temperature was raised from the room temperature to 100° C. at a temperature raising rate of 0.91° C./min and the temperature was maintained for 40 hours. With this process, oil components such as orientation lubricant and plasticizer were removed by evaporation.

<Calcining Process (De-Carbonize)>

A de-carbonizing process was applied to the formed shaped sheet after the de-oiling process under a high pressure, high temperature hydrogen atmosphere of 0.8 MPa. In this process, the temperature was raised from the room temperature to 370° C. at a raising rate of 2.9° C./min and the sheet was maintained under 370° C. for 3 hours.

<Sintering>

Subsequent to the de-carbonizing process, a sintering process was carried out. The sintering was conducted by inserting the second shaped body into a sintering die, and applying an initial compression load of 2.4 MPa in the lengthwise direction, and increasing the temperature to 700° C. at a temperature raising rate of 27° C./min. Thereafter, the temperature was raised under a pressure of 12 MPa to a final sintering temperature of 980° C. at a raising rate of 7.1° C./min and holding at this temperature for 5 minutes. The sintered body thus obtained was cooled down to the room temperature.

<Annealing>

The sintered body obtained by the sintering process was subjected to an annealing process by raising the temperature from the room temperature to 500° C. at a raising rate wherein the temperature is reached in 0.5 hour. The sintered body was held under the temperature for 1 hour and rapidly cooled to form a sintered body for forming a rare-earth magnet-forming sintered body.

Examples 2 and 3

Rare-earth magnet-forming sintered bodies were produced with processes similar to the Example 1 except conditions shown in Tables 2 to 4 were adopted. However, the thicknesses of the first shaped bodies were 2.0 mm in the Example 2 and 2.5 mm in the Example 3.

The pulverization in the jet mill was conducted with the following procedure. 1 weight part of methyl caproate was added to 100 weight parts of the hydrogen pulverized coarse particles of the alloy, and pulverization was conducted in a helium jet mill pulverizing apparatus (PJM-80HE; by NPK). The pulverized alloy particles were collected by a cyclone device, and excessively fine particles were removed. The He gas was supplied during the pulverizing process at a supply rate of 1 kg/h, under a pressure of 0.6 MPa and a flow rate of 1.3 m³/min, the oxygen concentration of 1 ppm or less and dew point of −75° C. or less.

In the case where an oleyl alcohol based oil was used in the kneading process, the following procedure was adopted. 100 weight parts of the pulverized alloy particles were mixed with 40 weight parts of 1-octene and agitated in a mixer (Trade Name: TX-0.5 manufactured by Inoue Works) under a temperature of 60° C. for 1 hour. Thereafter, the 1-octene and its reactant were evaporated under a suction pressure and an elevated temperature, and de-hydrogen processing was conducted. Then, oleyl alcohol, 1-octadecene, and a toluene solution (10 weight %) of polyisobutylene (PM) were added in the amounts shown in Table 4 to the alloy particles and, after removal of toluene, kneaded under a suction pressure for 2 hours, to produce a clayey compound material.

In the Examples 2 and 3, the de-oil process was not carried out, and the sintering was carried out not by press sintering but by a reduced pressure (non-pressing) sintering. In the reduced pressure sintering, the temperature was raised up to 980° C. at a raising rate of 8° C./min and maintained at the temperature for 2 hours.

The process conditions in the Examples 1 to 3 are shown in Table 2. Table 3 shows the compositions of the alloys A and B shown in Table 2. Table 4 shows polymers, orientation lubricants, and plasticizers used in the Examples 1 to 3.

TABLE 2

| | | | De-Oil Process | | | Calcining Process | | | Sintering Process | | | | | |
|---|---|---|---|---|---|---|---|---|---|---|---|---|---|---|
| | | | | | | | | | | Raising Rate | | | Raising Rate | |
| | Alloy Composition | Pulverization | Final Temp. (°C.) | Raising Rate (°C./min) | Holding Time (h) | Final Temp. (°C.) | Raising Rate (°C./min) | Holding Time (h) | Initial Load (MPa) | up to 700°C. (°C./min) | Load after 700°C. (MPa) | Final Temp. (°C.) | After 700°C. (°C./min) | Hold (min) |
| Example 1 | A | Ball Mill | 100 | 0.91 | 40 | 370 | 2.9 | 2 | 2.4 | 27 | 12 | 950 | 7.1 | 5 |
| Example 2 | B | Jet Mill | — | — | — | 370 | 0.82 | 3 | 0 | 8 | 0 | 980 | 8 | 120 |
| Example 3 | B | Jet Mill | — | — | — | 370 | 0.82 | 3 | 0 | 8 | 0 | 980 | 8 | 120 |

TABLE 3

| Alloy Composition | Nd | Fe | B | Pr | Cu | Ga | Nb | Co | Al |
|---|---|---|---|---|---|---|---|---|---|
| A | 23.00 | Balance | 1.00 | 6.75 | 0.10 | 0.10 | 0.20 | 2.00 | Trace |
| B | 25.25 | Balance | 1.01 | 6.75 | 0.13 | 0.13 | 0.20 | 2.00 | 0.10 |

TABLE 4

| | Polimer | Wt. Parts | Orientation Lubricant | Wt. Parts | Plasticsizer | Wt. Parts |
|---|---|---|---|---|---|---|
| Example 1 | PIB B150 8 wt. % Toluene Solution | 50 | 1-Octadecyne | 6.7 | — | — |
| Example 2 | PIB B100 10 wt. % Toluene Solution | 50 | Oleyl Alcohol | 0.8 | 1-Octadecene | 4.1 |
| Example 3 | PIB B100 10 wt. % Toluene Solution | 50 | Oleyl Alcohol | 0.8 | 1-Octadecene | 4.1 |

<Amounts of Carbon, Oxygen, Nitrogen, Hydrogen>

In the sintered body thus obtained, the amount of carbon was measured by a carbon analyzing device (EMA620SP; by Horiba Works) and the amounts of oxygen and nitrogen were measured by an oxygen-nitrogen analyzing device (PC436; by LECO). The amount of hydrogen was measured by a hydrogen analyzing device (RH404; by LECO).

The sintered body was ground at the surface to remove an oxide layer, and thereafter pulverized in a globe box into a particle size of about several tens microns. The pulverized particles were put into a Ni pan (by LECO Japan) for oxygen and nitrogen analysis and into an Sn pan (by LECO; 5.0 mm in dia.; 13 mm in height) for hydrogen analysis in the amount of 30 to 40 g, in a sealed manner to provide test samples. For carbon analysis, the particles were introduced directly into the carbon analyzing device in the amount of about 0.2 g and analyzed. In each analysis, the measurements were conducted twice, and average values were adopted.

<Sintered Particle Size>

The surface of the sintered body thus obtained was subjected to a surface treatment by a SiC paper polishing, buffing, and milling. Then, the sintered body was analyzed using an SEM (Trade Name: JSM-7001F by Nippon Eletron) incorporated with EBSD detector (Trade Name: AZtecHLK EBSD Nordlys Nano Integrated by Oxford Instruments). Alternatively, for the measurement, it is possible to use a SEM (SUPRA40VP by Zeiss) incorporated with an EBSD detector manufactured by EDAX (Hikari High Speed EBSD Detector). The angle of sight was determined such that at least 200 pieces of particles are included in the field of view. The analyzing step was 0.1 to 1 μm.

The data for analysis was analyzed using Cannel 5 (by Oxford Instruments) or OIM analyzing software version 5.2 (by EDAX). In determining boundary of the particles, a portion having 2° or more of deviation angle in orientation of crystal is considered as a boundary layer. Only particles in primary phase were extracted and circle-equivalent diameters of the particles were measured and an average of the measured circle-equivalent diameters was calculated to obtain the sintered particle size or diameter.

<Measurement of Axis Orientation Angle and Axis Orientation Angle Deviation>

The orientation angle of the easy magnetization axes in the sintered body thus obtained was subjected to a surface treatment by a SiC paper polishing, buffing, and milling. Then, the sintered body was analyzed using an SEM (Trade Name: JSM-7001F by Nippon Eletron) incorporated with EBSD detector (Trade Name: AZtecHLK EBSD Nordlys Nano Integrated by Oxford Instruments). Alternatively, for the measurement, it is possible to use a SEM (SUPRA40VP by Zeiss) incorporated with an EBSD detector manufactured by EDAX (Hikari High Speed EBSD Detector). The EBSD analysis was conducted with an angle of sight of 35 μm and 0.2 μm pitch. The analysis was conducted such that at least 30 sintered particles were contained in the range of the sight for the purpose of enhancing the analysis accuracy. The analyzed data was investigated by Chanel 5 (by Oxford Instruments), or an OIM analyzing software version 5.2 (by EDAX).

In the present embodiment, the sintered magnet of a trapezoidal shape was cut at the lengthwise center thereof, and measurement was conducted. The analysis was made at three positions along a thickness center line on the trapezoidal section, including positions close to the left and right ends and the center.

In each of the measurement positions, the direction of axis orientation of the particular measurement position was determined as a direction along which orientations of the easy magnetization axes appear most frequently. The angle of the orientation axis is defined with respect to a reference plane. In the analysis, as shown in FIG. 16(*a*), a plane containing the A2 and A3 axes is defined on a bottom surface of the trapezoidal configuration, and this plane was selected as the reference plane for determining the angle of the orientation axis. Specifically, an inclination angle α measured from the A1 axis toward the A3 axis, and an inclination angle (θ+β) from the A1 axis toward the A3 axis were measured for determining the axis orientation angle. In the plane containing the A1 and A2 axes, the predefined orientation angle of the easy magnetization axis shall always be in the plane of the A1 and A2 axes at any measuring position. Therefore, the inclination angle α is an angular deviation from the predefined defined direction, or a "deviation angle". The angle θ associated with the angle β represents a design value of angle between the orientation of the easy magnetization axis in the position of analysis and the A1 axis. Therefore, the angle β indicates a deviation of the orientation from the predefined direction, or a "deviation angle" in the position of analysis.

In the EBSD analysis at each position of analysis, the direction of the orientation vector was calibrated to 0° and thereafter, the deviation angle from the 0° direction of the orientation of the easy magnetization axis of each of the magnet material particles was calculated. An accumulated number of particles was calculated depending on the value of the deviation angle, and plotted in a graph. An angle in which the number of occurrence or the accumulated number reaches 50% is determined as the "half-width" angle of the axis orientation angle deviation Δθ. The results are shown in Table 5.

gen in the sintered body is made significantly small, so that a high magnetic property can be expected due to a small amount of impurities.

Example 4

A ring-shaped sintered body was produced with a procedure similar to Example 1 except a deformation process and a sintering process. The deformation process and the sintering process were conducted as described below.

<Deforming Process>

Figure 17:
FIG. 17 shows a die used in the Example 4 of the present invention, wherein (a) illustrates a die cavity for the external magnetic field application.
Figure 17:
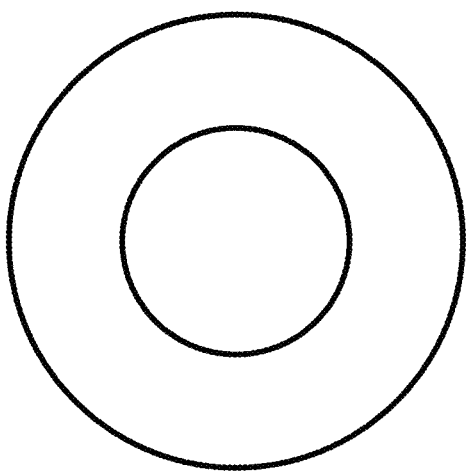

The compound material was charged into a die of corrosion resistant steel (SUS) having a cavity of a shape shown in FIG. 17(*a*), and was heated in a solenoid coil to a temperature of 80° C. while applying an external magnetic field of intensity of 12 T in a direction parallel to the thickness direction of the trapezoid. Then, the die was withdrawn from the solenoid coil maintaining the temperature of 80° C. to obtain a shaped body having oriented easy magnetization axes. The shaped body was taken out of the die.

Subsequently, the oriented shaped body was introduced into a graphite die having an annular shaped cavity in such a manner that the longer side of the trapezoidal configuration is faced to an outer side of the cavity and deformed into a ring shape. Then, the opposite end portions of the shaped body of the trapezoidal configuration is joined together by applying a toluene solution of PIB to the opposite end portions. After introducing into the graphite die, the temperature was raised to 60° C. and the shaped body in the die was pressed, to deform the shaped body into a ring shape.

<Sintering>

Subsequent to the de-carbonizing process, a sintering process was carried out under an atmosphere of a reduced pressure. In the sintering process, a graphite press pin of a ring shape shown in FIG. 17(*b*) was inserted into the graphite die. The pressing direction was perpendicular to the direction of the easy magnetization axes (in the axial direction of ring shape). Sintering was conducted by applying an initial compression load of 2.4 MPa, and increasing the temperature to 700° C. at a temperature raising rate of 9° C./min. Thereafter, the temperature was raised under a pressure of 12 MPa to a final sintering temperature of 950° C. for 5 minutes.

TABLE 5

| | Axis Orientation Angle | | | | | | Half-Width Value of Orientation Angle Deviation Δ θ (°) | | | Sintered Particle Size | Amount of Carbon | Amount of Oxygen | Amount of Hydrogen | Amount of Nitrogen |
|---|---|---|---|---|---|---|---|---|---|---|---|---|---|---|
| | Left End | | Center | | Right End | | | | | | | | | |
| | α (°) | β (°) | α (°) | β (°) | α (°) | β (°) | Left End | Center | Right End | μm | (ppm) | (ppm) | (ppm) | (ppm) |
| Example 1 | 0 | 27 | 0 | 0 | 0 | −30 | 22.6 | 23.4 | 22.5 | 1 | 170 | 1500 | 300 | 250 |
| Example 2 | 0 | 25 | −3 | −5 | −3 | −22 | 12.3 | 11.3 | 10.3 | 0.9 | 430 | 4200 | 900 | 300 |
| Example 3 | −5 | 21 | −3 | 2 | −3 | 17 | 12.1 | 10.6 | 11 | 0.9 | 500 | 3600 | 800 | 250 |

As shown in Table 5, the axis orientation is directed in the A1 direction in the central portion of the trapezoidal magnet, whereas the axis orientation is concentrated at the end portions toward the central portion of the trapezoidal configuration. It is apparent from the result that the direction of the easy magnetization axis of the magnet is controlled by the deformation process. With respect to the "axis orientation angle deviation" which is an indication of deviation in the orientation, the value is small in either Examples, but it is to be noted that in the Examples 2 and 3 wherein a non-pressure sintering was adopted, the deviation is further small. In the process wherein a high pressure calcination is conducted in a hydrogen atmosphere, the amount of hydro- Example 5

<Coarse Pulverization>

An alloy of a composition B prepared by a strip casting method had hydrogen absorbed in a room temperature and was held under an atmosphere of 0.85 MPa for one day. Then, the alloy was subjected to a hydrogen pulverization treatment by holding it under an atmosphere of 0.2 MPa for 1 day while cooling it.

<Fine Pulverization>

100 weight parts of the coarse pulverized particles of the alloy was mixed with 1 weight part of methyl caproate, and pulverization was conducted in a helium jet mill pulverizing apparatus (PJM-80HE; by NPK). The pulverized alloy particles were collected by a cyclone device, and excessively fine particles were removed. The He gas was supplied during the pulverizing process at a supply rate of 1 kg/h, under a pressure of 0.6 MPa and a flow rate of 1.3 m³/min, the oxygen concentration of 1 ppm or less and dew point of −75° C. or less. The average particle size after pulverization was measured by a laser diffraction/scattering particle size distribution measuring device (LA950; by Horiba). Specifically, the finely pulverized particles were slowly oxidized by exposing to atmosphere and thereafter several hundreds grams of particles were uniformly mixed with silicone oil (KF-96H-100 milion cs; by Shinetsu Chemical) to form a paste like mixture. The paste like mixture was then put between a pair of quartz plates to prepare a test specimen. (HORIBA Paste Method)

In a particle size distribution (volume %) graph, the value of D50 was taken as the average particle size. In a case where there are two peaks, D50 was taken only with respect to a peak of a smaller particle size.

<Kneading>

40 weight parts of 1-octene was added to 100 weight parts of the pulverized alloy particles and agitated in a mixer (TX-5; by Inoue Seisakusho) under an elevated temperature of 60° C. and a reduced pressure. Thereafter, 1-octene and its reactant were removed by evaporation under a reduced pressure and an elevated temperature. Then, 1.7 weight parts of 1-octadecine, 4.3 weight parts of 1-octadecene and 50 weight parts of an 8 weight % toluene solution of polyisobutylene (PIB) (Opanol B150; from BASF) were added to the alloy particles, and agitated under an elevated temperature of 70° C. and a reduced pressure to have toluene evaporated. Thereafter, kneading was conducted under a temperature of 70° C. and a suction pressure for 2 hours to produce a clayey compound material.

<Formation of First Shaped Body>

Figure 18:
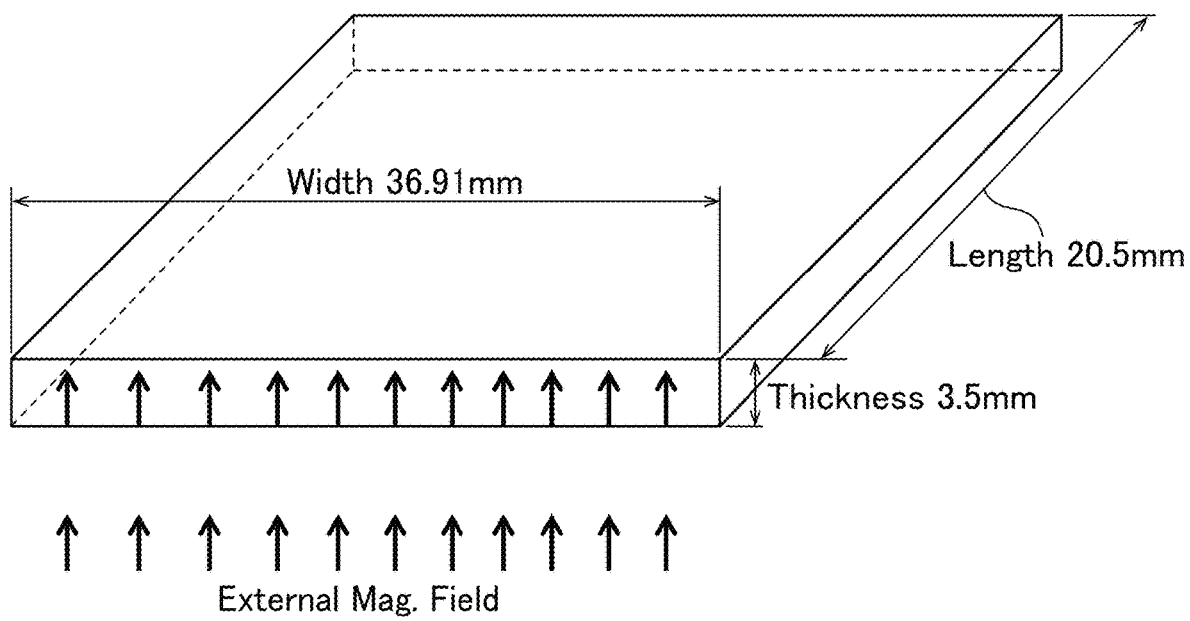
FIG. 18 is a diagrammatical perspective view of a die cavity adapted to be used for producing the first shaped body in accordance with the Example 5.

The compound material produced in the kneading process was introduced into a die of corrosion resistant steel (SUS) having a cavity similar to that shown in FIG. 18 to produce a first shaped body.

<Orientation under Magnetic Field>

The first shaped body was then subjected to an orientation process by applying an external parallel magnetic field in the direction shown in FIG. 18 to the corrosion resistant steel (SUS) die containing the first shaped body using a super conductive solenoid coil (Trade Name: JMTD-7T200 manufactured by JASTEC Co.). The orientation process was carried out by heating the corrosion resistant steel (SUS) die containing the first shaped body to a temperature of 80° C. and passing the die through the interior of the solenoid coil of 2000 mm axial length in 10 minutes while applying an external parallel magnetic field of an intensity of 7 T. Then, a de-magnetizing treatment was carried out by applying to the corrosion resistant steel (SUS) die containing the first shaped body a pulsating reverse magnetic field.

<Formation of Second Shaped Body>

Figure 19:
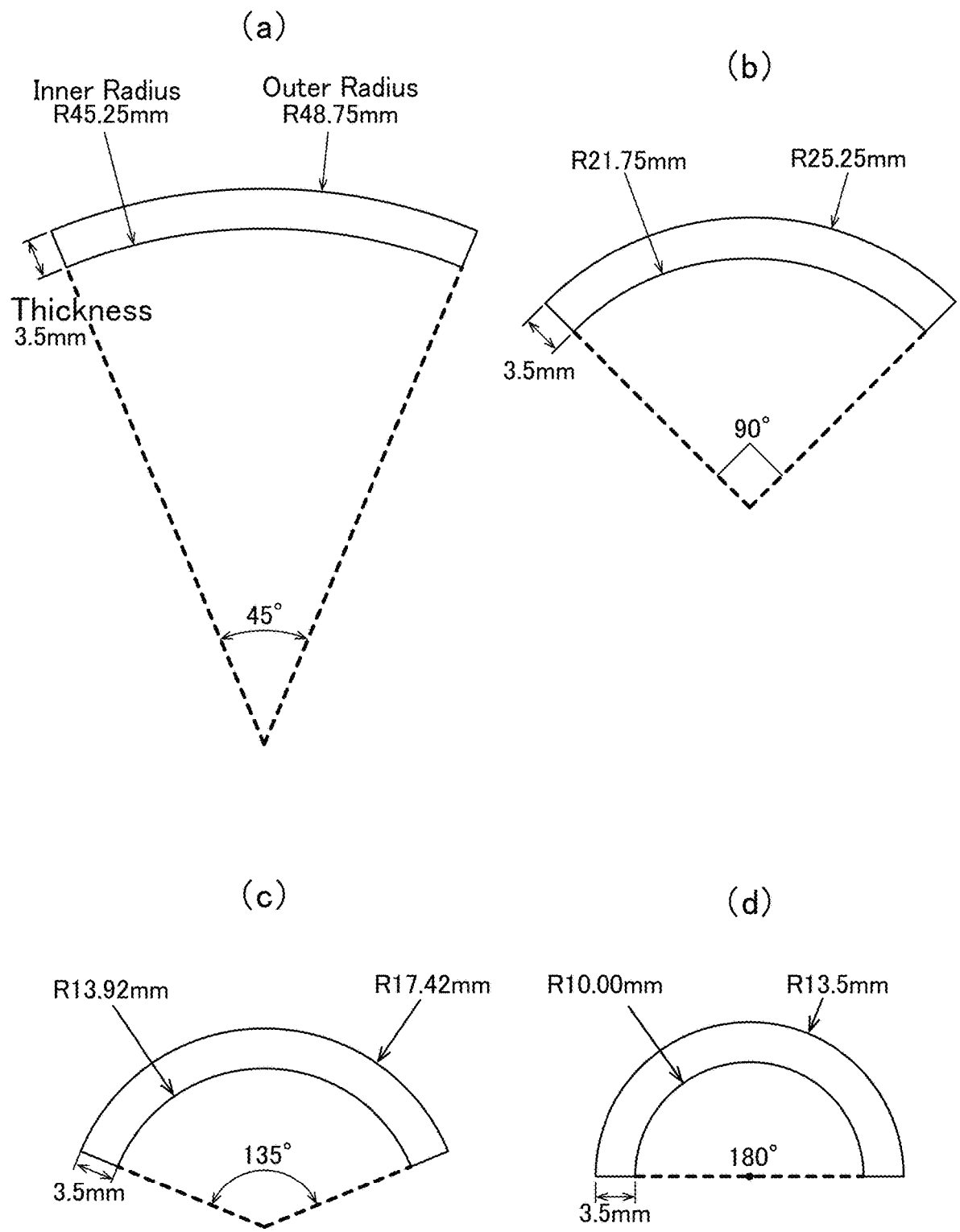
FIG. 19 shows a deformation process for shaping the second shaped body from the first shaped body in the Example 5.

The shaped body of the compound material demagnetized as described above was taken out of the corrosion resistant steel die and brought into an female die having an arcuate cavity having a radius of curvature of 48.75 mm, and pressed by a male die having an arcuate die surface having a radius of curvature of 45.25 mm to thereby deform the first shaped body into a first intermediate shaped body (FIG. 19(a)). The first intermediate shaped body was then transferred into a female die having an arcuate cavity having a radius of curvature of 25.25 mm, and pressed by a male die having an arcuate die surface having a radius of curvature of 21.75 mm to thereby deform the first intermediate shaped body into a second intermediate shaped body (FIG. 19(b)). The second intermediate shaped body was then transferred into a female die having an arcuate cavity having a radius of curvature of 17.42 mm, and pressed by a male die having an arcuate die surface having a radius of curvature of 13.92 mm to thereby deform the second intermediate shaped body into a third intermediate shaped body (FIG. 19(c)). Thereafter, the third intermediate shaped body was transferred into a female die having an arcuate cavity having a radius of curvature of 13.50 mm, and pressed by a male die having an arcuate die surface having a radius of curvature of 10.00 mm to thereby deform the third intermediate shaped body into a second shaped body of a semi-circular, arcuate shape (FIG. 19(d)). The deformation processes to deform into the intermediate shaped body and into the second shaped body were carried out under a temperature condition of 60 vsheet in the intermediate shaping die under a temperature of 70° C. in such a manner that the thickness does not change after the deformation.

<Calcining Process (De-Carbonize)>

A de-carbonizing process was applied to the second shaped body in a de-carbonizing furnace having a high pressure hydrogen atmosphere of 0.8 MPa. In this process, the temperature was raised from the room temperature to 500° C. at a raising rate of 1.0° C./min and the second shaped body was maintained under 500° C. for 2 hours. During the process, hydrogen flow was maintained so as to prevent dissolved organic substance from remain in the de-carbonizing furnace. The hydrogen flow rate was 2 L/min.

<Sintering>

The shaped body after the de-carbonizing process was sintered in a reduced atmosphere. The sintering was conducted by increasing the temperature to 970° C. in 2 hours at a temperature raising rate of 7.9° C./min, and maintaining at 970° C. for 2 hours. The sintered body thus obtained was cooled down to the room temperature.

<Annealing>

The sintered body obtained by the sintering process was subjected to an annealing process by raising the temperature from the room temperature to 500° C. at a raising rate wherein the temperature is reached in 0.5 hour. The sintered body was held under the temperature for 1 hour and rapidly cooled for annealing to form a sintered body for forming a rare-earth magnet-forming sintered body having a semi-circular, arcuate section.

<Measurement of Axis Orientation Angle and Deviation Angle>

Figure 20:
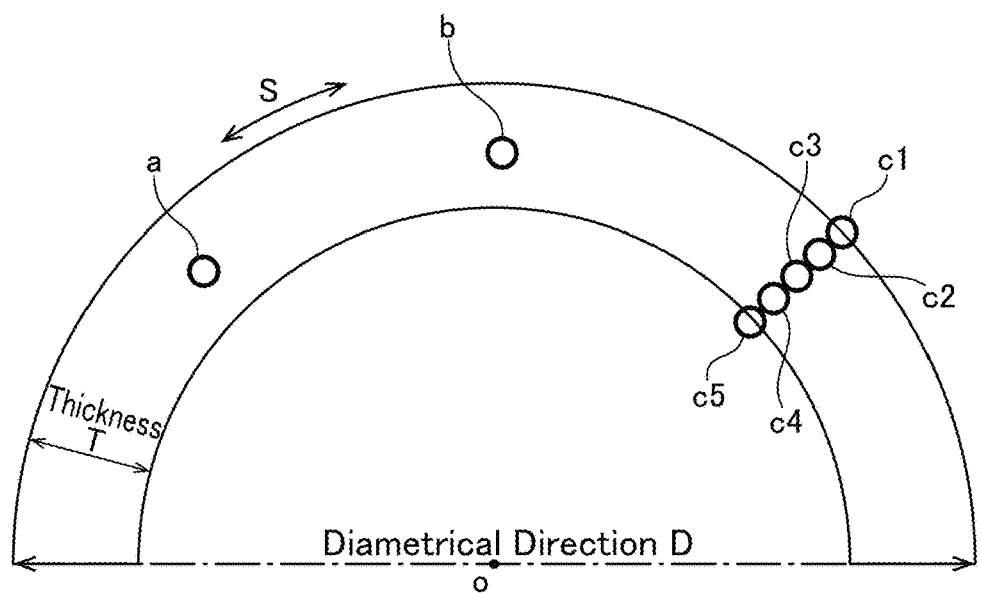
FIG. 20 is a diagrammatical illustration showing points of orientation axes analysis in the rare-earth magnet-forming sintered body of the embodiments 5 to 9: and, FIG. 21 shows coordinates and reference plane for measurements of orientation axis angles.

Measurements were conducted on the sintered body thus obtained with a method similar to that described with reference to the Example 1. In this example, however, the sintered body having an arcuate cross-section and a length wise direction perpendicular to the cross-section was cut in a widthwise direction at the lengthwise center to produce a section for measurement. In FIG. 20, there is shown a section of the semi-circular, annular rare-earth magnet-forming sintered body on which the measurements were made. The sintered body has a diametrical direction D represented by a diametrical line connecting the opposite ends, a center O of radius of curvature of the arc, a thickness T of the sintered body taken along a diametrical direction, and a circumferential direction S. The direction perpendicular to the plane of FIG. 29 is the lengthwise direction L.

Positions of measurements for obtaining axis orientation angles and axis orientation angle deviations are determined on a thickness center arcuate line drawn on the arcuate section along the center of the thickness T, and the measurement positions are taken on the thickness center arcuate line at three points which are quadrant positions of the thickness center arcuate line, namely, a middle point between circumferentially center point and a left end of the thickness center arcuate line (position "a" in FIG. 20), the circumferentially center point of the thickness center arcuate line (position "b" in FIG. 20), and a middle point between the circumferentially center point and a right end of the thickness center arcuate line (position "c3" in FIG. 20). Further, on a radial line passing through the measurement point c3 in FIG. 20, five positions were determined as the measurement positions. The five positions are a point on the radial line 300 μm radially inside from the convex surface of the arcuate section (position "c1" in FIG. 20), a middle point between the convex surface and the thickness center point c3 (position "c2" in FIG. 2), a middle point between the concave surface and the thickness center point c3 (position "c4" in FIG. 20), and a point on the radial line 300 μm radially outside from the concave surface of the arcuate section (position "c5" in FIG. 20).

Figure 21:
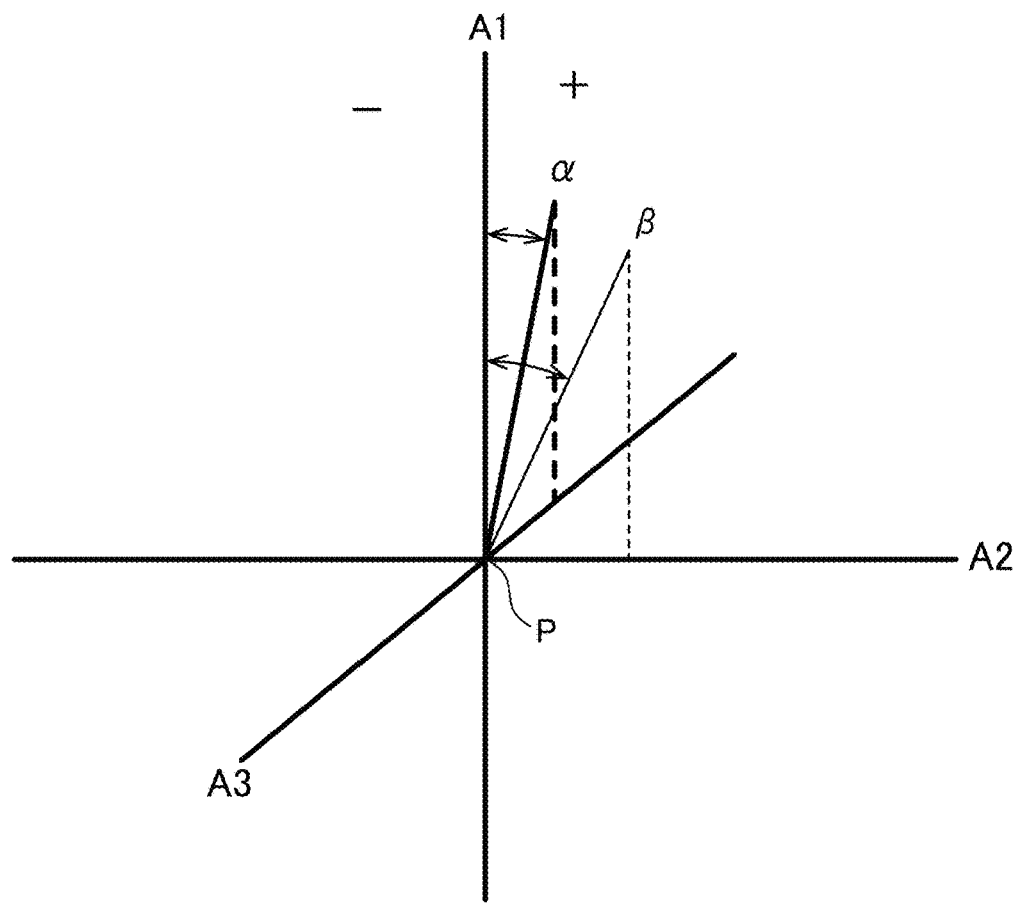

In each of the measurement positions, an axis orientation direction was determined as a direction where crystal "C" axes (001) are oriented at most frequent occurrences. Referring to FIG. 21, in a plane containing the semi-circular arcuate section of the sintered body, there is defined a rectangular coordinates including an A1 axis passing from the center O of the curvature of the arc through the circumferentially center point of the thickness center arcuate line (position "b" in FIG. 20), an A2 axis which is a radial line extending through the center O of the curvature of the arc and orthogonal to the A1 axis, and an A3 axis extending through the center O in a direction orthogonal to both the A1 and A2 axes and extending in a lengthwise direction of the sintered body. A plane containing the A2 and A3 axes is determined as a reference plane. In the rectangular coordinates, measurements were made on an inclination angle α which was a direction of orientation of the easy magnetization axis from the A1 axis toward the A3 axis, and an inclination angle (θ+β) which was a direction of orientation of the easy magnetization axis from the A1 axis toward the A2 axis. In the plane containing the A1 and A2 axes, the predefined orientation angle of the easy magnetization axis shall always be in the plane of the A1 and A2 axes at any measuring position. Therefore, the inclination angle α is an angular deviation from the predefined defined direction, or a "deviation angle". The angle θ associated with the angle β represents a design value of angle between the orientation of the easy magnetization axis in the position of analysis and the A1 axis. Therefore, the angle β indicates a deviation of the orientation from the predefined direction, or a "deviation angle" in the position of analysis.

In each measurement position, measurements on the axis orientations of the easy magnetization axes were made on more than a predetermined number of magnet material particles. It is preferable that the size of each measurement position is determined such that at least 30 magnet material particles are included, as the predetermined number, in the measurement position. In the present example, the size of the measurement position was determined to contain approximately 700 magnet material particles.

Further, in the EBSD analysis in each of the measurement positions, a base axis orientation in the measurement position was determined at 0°, and thereafter, the deviation angle Δθ from the base axis orientation which was 0° direction of the orientation of the easy magnetization axis of each of the magnet material particles was calculated. An accumulated number of particles was calculated depending on the values of the deviation angles Δθ, and plotted in a graph. An angle in which the number of occurrence or the accumulated number reaches 50% is determined as the "half-width" angle of the axis orientation angle deviation (half width value of Δθ).

The results of the analysis are shown in Table 6.

The maximum elongation shown in Table 6 is obtained by a formula $$\{(W2-W1)/W1\}\times 100$$

where W1 is a widthwise dimension of the first shaped body and W2 is a convex side arc dimension of the second shaped body.

TABLE 6

| | | | Axis Orientation Angle | | | | |
| --- | --- | --- | --- | --- | --- | --- | --- |
| | Maximum Elongation (%) | Measurement Positions | Half-Width Value of Δθ (°) | Slanted Angle α (°) | Slanted Angle θ + β (°) | θ (°) | β (°) |
| Example 5 | 14.8 | a | 10.9 | 2 | −41 | −45 | 4 |
| | | b | 11.1 | 0 | 0 | 0 | 0 |
| | | c3 | 11.1 | 3 | 46 | 45 | 1 |
| | | c1 | 9.0 | 4 | 45 | 45 | 0 |
| | | c2 | 10.2 | 3 | 46 | 45 | 1 |
| | | c4 | 9.7 | 2 | 46 | 45 | 1 |
| | | c5 | 11.0 | 2 | 48 | 45 | 3 |

It has been confirmed from the values of the axis orientation angles at the measuring positions a, b and c3 that a radial orientation sintered body was produced as designed. Further, the value of the angle β in each of the measurement positions is at most 4°, so that it has been confirmed that the deviation from the design value is small. Further, the value of the "half-width" angle of the axis orientation angle deviation Δθ is at most 11.1°, so that it has been confirmed that the sintered body has small value of deviation angle.

Examples 6 to 10

Sintered bodies were produced with processes similar to the Example 5 except that the bending angle of the second shaped body, and the dimensions in the first shaped body, the first, second and third intermediate shaped bodies and the second shaped body were changed.

In this case, deformation processes were conducted that in each deformation steps from the first shaped body to the second shaped body, the processes were conducted stepwise such that a deformation of 45° was produced in each step. In the Example 6, for example, a first shaped body was deformed to produce a 45° deformation into a first intermediate shaped body 1, and the first intermediate shaped body was further deformed to produce a 45° deformation into a second shaped body as a result of total 90° of deformation. However, in the Example 10, the orientation process was carried out by applying an external parallel magnetic field by a super conductive solenoid coil (JMTD-12T100; by JASTEC). The orientation process was conducted with a corrosion resistant steel (SUS) die having a compound charged therein, by heating the die to 80° C., and placing the die in the super conductive solenoid coil, and thereafter energizing the coil to increase the intensity from 0 T to 7 T in a time period of 20 minutes, then decreasing the intensity to 0 T in a time period of 20 minutes. Thereafter, the die was de-magnetized by applying a magnetic field of a reverse polarity. The application of the magnetic field of reverse polarity was conducted by changing the intensity from −0.2 T to +0.18 T, and then to −0.16 T and finally to zero magnetic field intensity.

TABLE 7

| | Bending Angle ° | Thickness mm | First Shaped Body Width mm | Length mm | Intermediate Shaped Body 1 Inner Radius mm | Outer Radius mm | Intermediate Shaped Body 2 Inner Radius mm | Outer Radius mm | Intermediate Shaped Body 3 Inner Radius mm | Outer Radius mm | Second Shaped Body Inner Radius mm | Outer Radius mm |
|---|---|---|---|---|---|---|---|---|---|---|---|---|
| Example 5 | 180 | 3.5 | 36.91 | 20.0 | 45.25 | 48.75 | 21.75 | 25.25 | 13.92 | 17.42 | 10.00 | 13.50 |
| Example 6 | 90 | 3.5 | 36.91 | 20.0 | 45.25 | 48.75 | — | — | — | — | 21.75 | 25.25 |
| Example 7 | 180 | 5.0 | 39.27 | 20.0 | 47.50 | 52.50 | 22.5 | 27.5 | 14.17 | 19.17 | 10.00 | 15.00 |
| Example 8 | 135 | 5.0 | 39.27 | 20.0 | 47.50 | 52.50 | 22.5 | 27.5 | — | — | 14.17 | 19.17 |
| Example 9 | 180 | 3.5 | 21.21 | 15.00 | 25.25 | 28.75 | 11.75 | 15.25 | 7.25 | 10.75 | 5.00 | 8.75 |
| Example 10 | 180 | 3.5 | 11.78 | 10.00 | 13.25 | 16.75 | 5.75 | 9.25 | 3.25 | 6.75 | 2.00 | 5.50 |

The results of the evaluation of each sintered body are shown in Tables 8 and 9.

TABLE 8

| | Maximum Elongation (%) | Measurement Positions | Half-Width Value of $\Delta\theta$ (°) | Axis Orientation Angle Slanted Angle $\alpha$ (°) | Slanted Angle $\theta + \beta$ (°) | $\theta$ (°) | $\beta$ (°) |
|---|---|---|---|---|---|---|---|
| Example 6 | 7.4 | a | 9.4 | 2 | −23 | −23 | 0 |
| | | b | 8.9 | −1 | −1 | 0 | −1 |
| | | c3 | 9.0 | 2 | 18 | 23 | −5 |
| | | c1 | 9.7 | 2 | 17 | 23 | −6 |
| | | c2 | 10.4 | 2 | 18 | 23 | −5 |
| | | c4 | 8.7 | 0 | 17 | 23 | −6 |
| | | c5 | 9.4 | 0 | 17 | 23 | −6 |
| Example 7 | 19.9 | a | 8.9 | 2 | −49 | −45 | −4 |
| | | b | 9.4 | 0 | −5 | 0 | −5 |
| | | c3 | 8.7 | 3 | 47 | 45 | 2 |
| | | c1 | 9.7 | −2 | 49 | 45 | 4 |
| | | c2 | 9.1 | 3 | 46 | 45 | 1 |
| | | c4 | 9.4 | 3 | 47 | 45 | 2 |
| | | c5 | 10.6 | 1 | 46 | 45 | 1 |
| Example 8 | 15.0 | a | 8.4 | 0 | −33 | −34 | 1 |
| | | b | 7.8 | 0 | −1 | 0 | −1 |
| | | c3 | 9.2 | 2 | 33 | 34 | −1 |
| Example 9 | 25.9 | a | 8.9 | 0 | −48 | −45 | −3 |
| | | b | 8.9 | 0 | 0 | 0 | 0 |
| | | c3 | 8.5 | 0 | 49 | 45 | 4 |
| | | c1 | 10.2 | 1 | 54 | 45 | 9 |
| | | c2 | 9.3 | 0 | 52 | 45 | 7 |
| | | c4 | 8.8 | 0 | 51 | 45 | 6 |
| | | c5 | 10.1 | 1 | 51 | 45 | 6 |
| Example 10 | 46.6 | a | 14.8 | 5 | −38 | −45 | 7 |
| | | b | 12.5 | 3 | 1 | 0 | 1 |
| | | c3 | 14.2 | 2 | 37 | 45 | −8 |
| | | c1 | 14.2 | 5 | 48 | 45 | 3 |
| | | c2 | — | — | — | — | — |
| | | c4 | — | — | — | — | — |
| | | c5 | 12.5 | 3 | 47 | 45 | 2 |

TABLE 9

| | Sintered Particle Size µm | Sintered Body Density g/cm³ | Amount of Carbon (ppm) | Amount of Oxygen (ppm) | Amount of Hydrogen (ppm) | Amount of Nitrogen (ppm) |
|---|---|---|---|---|---|---|
| Example 5 | 1.0 | 7.57 | 170 | 3000 | 780 | 190 |
| Example 6 | 1.0 | 7.57 | 360 | 2800 | 520 | 150 |
| Example 7 | 1.1 | 7.46 | 110 | 4000 | 1350 | 230 |
| Example 8 | 1.0 | 7.52 | 900 | 3400 | 610 | 210 |
| Example 9 | 1.0 | 7.55 | 230 | 4200 | 2300 | 190 |
| Example 10 | 1.0 | 7.55 | 210 | 4700 | 3000 | 220 |

It has been confirmed in comparing the values of the axis orientation angles in the measurement positions a, b and c3 in the Examples 6 to 10 that sintered bodies having radial orientations as designed could be produced. Further, the angle β is 9° at the largest, so that it has been confirmed that sintered bodies of radial orientations were obtained as designed. In addition, the half value width of the deviation angle Δθ is at most 14.8° so that the sintered bodies are of small deviation angle. The Example 10 shows an axis orientation angle deviation which is a little bit larger than the other Examples, however, if a super conductive coil similar to that used in the Examples 5 to 9 is used the axis orientation angle deviation in the Example 10 would be in the range of 8 to 11°.

The sintered body of the Example 10 having a maximum elongation of 46.6% that is the highest among the Examples was further investigated for crack depth with SEM device, by cutting the sintered body at the lengthwise center. It has been found that the maximum crack depth was 35 µm, so that it has been confirmed that crack was not essentially produced.

Examples 11 and 12

Examples 11 and 12 were produced in a manner similar to Example 5 except that the bending angles 45° and 135° were changed. The second shaped body in Example 11 was of a configuration identical with that shown in FIG. 19(a), and the second shaped body in Example 12 was of a configuration identical with that shown in FIG. 19(c). The second shaped body in Example 11 had a maximum elongation of 3.7%, and the second shaped body in Example 12 had a maximum elongation of 11.1%. The sintered magnets obtained by magnetizing the second shaped bodies in Examples 11 and 12 were evaluated in a similar way described before. As the results, as in the previous Examples, it has been confirmed that the deviation in axis orientation angle from the design value was small and that the deviation angle distribution was small.

From the results described above, it has been confirmed that, up to at least 50% of elongation, it is possible to control the direction of orientation without any random distribution of the axis orientation angle, and without any increase in the half value width of the deviation angle Δθ.

As previously described, it is preferable that a chemical compound having a unsaturated bond is used for the orientation lubricant to be added to the compound material which is a mixture of magnet material particle containing rare-earth substances. In such a case, the method for producing a rare-earth magnet-forming sintered body is as follows.

A method for producing a rare-earth magnet-forming sintered body wherein a number of magnet material particles including rare-earth substances and each having an easy magnetization axis are integrally sintered,
the method including:
a first shaped body forming step for forming a first shaped body using a compound material which is formed by mixing the magnet material particles including rare-earth substances with a resin material and an orientation lubricant,
an orientation step wherein the first shaped body is maintained at a temperature higher than a softening temperature of the resin material and applied with an external parallel magnetic field to thereby have the easy magnetization axes of the magnet material particles oriented in parallel to the external magnetic field, and
a sintering step wherein the first shaped body is heated to a sintering temperature without any deformation or after a deformation to transfer the first shaped body into a second shaped body, and maintain at the sintering temperature for a predefined time, such that the resin material in the shaped body is dissipated and the magnet material particles are sintered together,
wherein the orientation lubricant is a chemical compound having unsaturated bond.

It should be noted that the present invention is not limited to each of the described embodiments and modifications are possible within a scope of the appended claim or claims. Any combination of various technical features described in connection with different embodiments is also covered b the scope of the appended claim or claims.

LIST OF REFERENCE SIGNS

1; 101: rare-earth permanent magnet-forming sintered body
2; 102: upper side
3; 103: lower side
4, 5; 104, 105: end surface
20: electric motor
21: rotor core
21a: peripheral surface
22: air gap
23: stator
23a: teeth
23b: field coil
24: magnet receiving slot
24a: straight central portion
24b: slanted portion
30: rare-earth magnet
117: compound
118: support substrate
119: green sheet
120: slot-die
123: process sheet piece
125: sintering process sheet piece
C: easy magnetization axis
θ: slanted angle

The invention claimed is:
1. A method for producing a rare-earth magnet-forming sintered body wherein a number of magnet material particles including rare-earth substances and each having an easy magnetization axis are integrally sintered; comprising,
a first shaped body forming step for forming a first shaped body of a three dimensional shape which has a lengthwise dimension in a lengthwise direction, a thickness dimension defined between a first surface and a second surface in a thickness direction in a cross-section perpendicular to the lengthwise direction, and a width- wise dimension taken in a widthwise direction which is perpendicular to the thickness direction, the first shaped body being formed from a compound material which is formed by mixing the magnet material particles with a resin material;

an orientation step for orienting the easy magnetization axes of the magnet material particles by applying to the first shaped body an external parallel magnetic field, while heating the first shaped body to a temperature higher than a softening temperature of the resin material, to have the easy magnetization axes of the magnet material particles oriented in a direction parallel with the direction of the magnetic field;

a second shaped body forming step for forming a second shaped body by applying a bending force to the first shaped body to produce a bending deformation in the first shaped body such that at least a portion of the first shaped body is changed in shape in the cross-section to thereby change the orientations of the easy magnetization axes of the magnetic material in the at least a portion in the cross-section to a direction different from the direction in the first shaped body; and a sintering step wherein the second shaped body is heated to a sintering temperature and held in the sintering temperature for a predefined time so that the resin material in the second shaped body is dissipated and the magnet material particles are sintered together to produce the sintered body, the sintering step being carried out with a pressing force applied to the second shaped body in the lengthwise direction.

2. The method as claimed by claim 1, wherein said magnetic field is directed along the cross-section of the first shaped body from the first surface to the second surface.

3. The method as claimed by claim 1, wherein the resin material contained in the compound is a thermoplastic resin material.

4. The method as claimed by claim 1, wherein the sintering temperature is 800° C. to 1200° C.

5. The method as claimed by claim 4, wherein the pressing force applied to the second shaped body is controlled in the range between 0.01 MPa and 100 MPa, and the pressing force is applied continuously or intermittently.

6. The method as claimed by claim 2, wherein the sintering step is carried out in an atmosphere of 15 MPa or less, with a temperature raised up to the predefined sintering temperature at a temperature raising rate of 3° C./min to 100° C./min, and the pressing force applied to the second shaped body in the sintering step is maintained until the dimension change of the second shaped body in the direction of pressing force becomes substantially 0.

7. The method as claimed by claim 2, wherein the sintering step is carried out under an atmosphere of reduced pressure of 6 Pa or less, by raising the temperature up to a predefined sintering temperature at a temperature raising rate of 3° C./min to 30° C./min, and the pressing force applied to the second shaped body in the sintering step is maintained until the dimension change of the second shaped body in the direction of pressing force becomes substantially 0.

8. The method as claimed by claim 1, wherein after the second shaped body forming step and before the sintering step, a calcining step is carried out for removing carbon, by heating the second shaped body in a hydrogen atmosphere to have the carbon content in the thermoplastic resin contained in the second shaped body reacted with the hydrogen.

9. The method as claimed by claim 8, wherein the calcining step is conducted at a temperature raising rate of 10° C./min or less.

10. The method as claimed by claim 8, wherein a de-oiling step is carried out before the calcining step, and the calcining step is conducted at a temperature raising rate of 10° C./min or less.

11. The method as claimed by claim 8, wherein the calcining step is conducted under a temperature range of 250° C. to 600° C.

12. The method as claimed by claim 8, wherein the calcining step is conducted under a temperature range of 300° C. to 500° C.

13. The method as claimed by claim 8, wherein the calcining step is conducted under a pressure of 0.1 MPa to 70 MPa.

14. The method as claimed by claim 8, wherein the magnet material particles have an average size of 6 μm or less.

15. The method as claimed by claim 14, wherein the magnet material particles are produced in an inert gas atmosphere having oxygen concentration of 0.5% or less.

16. The method as claimed by claim 3, wherein the thermoplastic resin is a polymer which does not contain oxygen in its structure.

17. The method as claimed by claim 16, wherein the thermoplastic resin is a polymer which comprises one or more polymers or copolymers formed from a monomer represented by the following general formula (1):

(where each of R1 and R2 denotes one of a hydrogen atom, a lower alkyl group, a phenyl group and a vinyl group.)

18. The method as claimed by claim 16, wherein the thermoplastic resin is selected from a group including: polyisobutylene (PIB); polyisoprene (isoprene rubber (IR)); polypropylene; a poly(α-methylstyrene) polymerized with α-methylstyrene; polyethylene; polybutadiene (butadiene rubber (BR)); polystyrene; a styrene-isoprene-styrene block copolymer (SIS); butyl rubber (IIR); a styrene-butadiene-styrene block copolymer (SBS); a styrene-ethylene-butadiene-styrene copolymer (SEBS); a styrene-ethylene-propylene-styrene copolymer (SEPS); an ethylene-propylene copolymer (EPM); EPDM obtained by copolymerizing diene monomers together with ethylene and propylene; a 2-methyl-1-pentene polymerized resin as a polymer of 2-methyl-1-pentene; and a 2-methyl-1-butene polymerized resin as a polymer of 2-methyl-1-butene.

19. The method as claimed by claim 16, wherein the thermoplastic resin is of the one which has a glass transition temperature or fluidity starting temperature of 250° C. or lower.

20. The method as claimed by claim 3, wherein the thermoplastic resin does not contain oxygen atom, nitrogen atom and other hetero-atoms.

21. The method as claimed by claim 1, wherein the first shaped body formed in the first shaped body forming step has a straight central region, end regions contiguous with and provided at the opposite end portions of the central region, wherein each of the end regions is of an arcuate configuration with the second surface being of a convex shape and the first surface being of a concave shape and, in the second shaped body forming step, each of the end regions contiguous with the corresponding end portion of the central region is deformed to be straight with the corresponding end portion of the central region, whereby the orientations of the easy magnetization axes in the second shaped body become such that, in the central region, the easy magnetization axes are oriented in the thickness direction from the first surface to the second surface to provide a parallel orientation, whereas in the end regions, the easy magnetization axes are oriented to converge widthwise inwards from the first surface to the second surface.

22. The method as claimed by claim 1, wherein the first shaped body formed in the first shaped body forming step has a configuration of an arc with the second surface being of a convex shape and the first surface being of a concave shape, and in the second shaped body forming step, the first shaped body is deformed into a straight shape or into a configuration of an arc having a radius of curvature larger than that of the first shaped body, so that the easy magnetization axes of the second shaped body are oriented to converge widthwise inwards from the first surface to the second surface.

23. The method as claimed by claim 1, wherein the first shaped body formed in the first shaped body forming step has a configuration of an arc with the second surface being of a concave shape and the first surface being of a convex shape, and in the second shaped body forming step, the first shaped body is deformed into a straight shape or into a configuration of an arc having a radius of curvature larger than that of the first shaped body, so that the easy magnetization axes of the second shaped body are oriented to spread widthwise outwards from the first surface to the second surface.

24. The method as claimed by claim 1, wherein the resin material is a thermoplastic resin material, and the first shaped body is of a configuration having a cross-section of an elongated rectangle with a pair of long sides, and a pair of short sides perpendicular to the long side, and an external magnetic field is applied in a direction perpendicular to the long side, and wherein the first shaped body is deformed so that the long side forms an annular shape and the end portions are welded together by melting the materials in the end portions to form a second shaped body.

25. The method as claimed by claim 24, wherein the external magnetic field applied to the first shaped body is directed from the first surface to the second surface, and the second shaped body is formed by deforming the first shaped body such that the first surface is radially inside of the annular shape whereby, the easy magnetization axes of the magnet material particles contained in the second shaped body is oriented in radial directions to provide a radial orientation.

26. The method as claimed by claim 24, wherein the external magnetic field applied to the first shaped body is directed along the cross-section from the first surface to the second surface, and the second shaped body is formed by deforming the first shaped body into an annular configuration such that the first surface is in parallel with the second surface whereby, the easy magnetization axes of the magnet material particles contained in the second shaped body is oriented in axial directions to provide an axial orientation to form a second shaped body having an axial orientation wherein the easy magnetization axes of the magnet material particles are oriented in an axial direction, the second shaped body is then used to form an annular shaped rare-earth magnet-forming sintered body having an axial orientation, at least one of the radially oriented sintered body produced by sintering the second shaped body in accordance with claim 25 and at least one of the axially oriented sintered body produced from corresponding second shaped bodies are combined together by arranging the radially oriented sintered bodies and the axially oriented sintered bodies alternately one from the other, to provide a sintered body of a Halbach arrangement.

27. The method as claimed by claim 1, wherein the firs shaped body is provided by forming the compound material into a sheet, and cutting the sheet into a desired shape.

28. The method as claimed by claim 1, wherein the compound material contains an orientation lubricant comprising a chemical compound having unsaturated bond.

* * * * *